(12) United States Patent
Ito

(10) Patent No.: US 7,591,130 B2
(45) Date of Patent: Sep. 22, 2009

(54) CONTROL APPARATUS AND METHOD FOR VEHICLE HAVING INTERNAL COMBUSTION ENGINE AND CONTINUOUSLY VARIABLE TRANSMISSION, AND CONTROL APPARATUS AND METHOD FOR INTERNAL COMBUSTION ENGINE

(75) Inventor: Yasushi Ito, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/033,136

(22) Filed: Jan. 12, 2005

(65) Prior Publication Data

US 2005/0124459 A1 Jun. 9, 2005

Related U.S. Application Data

(62) Division of application No. 10/092,800, filed on Mar. 8, 2002, now Pat. No. 6,866,610.

(30) Foreign Application Priority Data

| Mar. 30, 2001 | (JP) | ............................. 2001-101692 |
| Apr. 23, 2001 | (JP) | ............................. 2001-124998 |
| Apr. 23, 2001 | (JP) | ............................. 2001-124999 |

(51) Int. Cl.
*F01N 3/00* (2006.01)

(52) U.S. Cl. ............................. 60/277; 60/274; 60/285; 60/295; 60/297

(58) Field of Classification Search .................. 60/274, 60/285, 286, 295, 297, 311, 303, 277
See application file for complete search history.

(56) References Cited

U.S. PATENT DOCUMENTS

| 4,730,586 A | | 3/1988 | Yamaguchi et al. |
| 5,261,378 A | | 11/1993 | Fenchel et al. |
| 5,746,989 A | * | 5/1998 | Murachi et al. .......... 423/213.7 |

(Continued)

FOREIGN PATENT DOCUMENTS

EP 0 859 132 A1 8/1998

(Continued)

OTHER PUBLICATIONS

Osamura et al., "Improvement of Drive Torque Response by Applying an Integrated Control Algorithm of a Diesel Engine and CVT", JSAE (Society of Automotive Engineers of Japan) Convention Proceedings No. 66-00. (w/abstract).

*Primary Examiner*—Tu M Nguyen
(74) *Attorney, Agent, or Firm*—Oliff & Berridge, PLC

(57) ABSTRACT

A control apparatus is provided for a vehicle including an internal combustion engine and a continuously variable transmission capable of controlling an output speed of the engine. A controller of the control apparatus determines a first operating point at which a total fuel consumption amount is minimized as an optimal operating point, such that the total fuel consumption amount is obtained by adding an amount of a fuel consumed by an exhaust purifying device disposed in an exhaust system to an amount of a fuel consumed by the engine for generating a required output. The controller then controls an engine load and also controls a speed ratio of the transmission so that the engine operates at the optimal operating point.

6 Claims, 17 Drawing Sheets

U.S. PATENT DOCUMENTS

| | | | |
|---|---|---|---|
| 5,771,685 A * | 6/1998 | Hepburn | 60/274 |
| 5,974,791 A * | 11/1999 | Hirota et al. | 60/276 |
| 5,997,434 A | 12/1999 | Graf et al. | |
| 6,032,461 A | 3/2000 | Kinugasa et al. | |
| 6,151,542 A | 11/2000 | Yoshino et al. | |
| 6,167,696 B1 * | 1/2001 | Maaseidvaag et al. | 60/274 |
| 6,212,880 B1 * | 4/2001 | Takano et al. | 60/274 |
| 6,311,118 B1 | 10/2001 | Ito et al. | |
| 6,412,276 B1 * | 7/2002 | Salvat et al. | 60/295 |
| 6,497,095 B2 * | 12/2002 | Carberry et al. | 60/295 |
| 6,591,604 B2 * | 7/2003 | Surnilla et al. | 60/277 |
| 6,594,990 B2 * | 7/2003 | Kuenstler et al. | 60/295 |
| 6,817,174 B1 * | 11/2004 | Igarashi et al. | 60/295 |

FOREIGN PATENT DOCUMENTS

| | | |
|---|---|---|
| EP | 1 052 132 A2 | 11/2000 |
| JP | 60-243357 A | 12/1985 |
| JP | A 4-255541 | 9/1992 |
| JP | 8-177463 | 7/1996 |
| JP | 11-336530 A | 12/1999 |
| JP | A 2000-46177 | 2/2000 |
| JP | A 2000-282926 | 10/2000 |
| JP | 2000 343983 | 12/2000 |

* cited by examiner

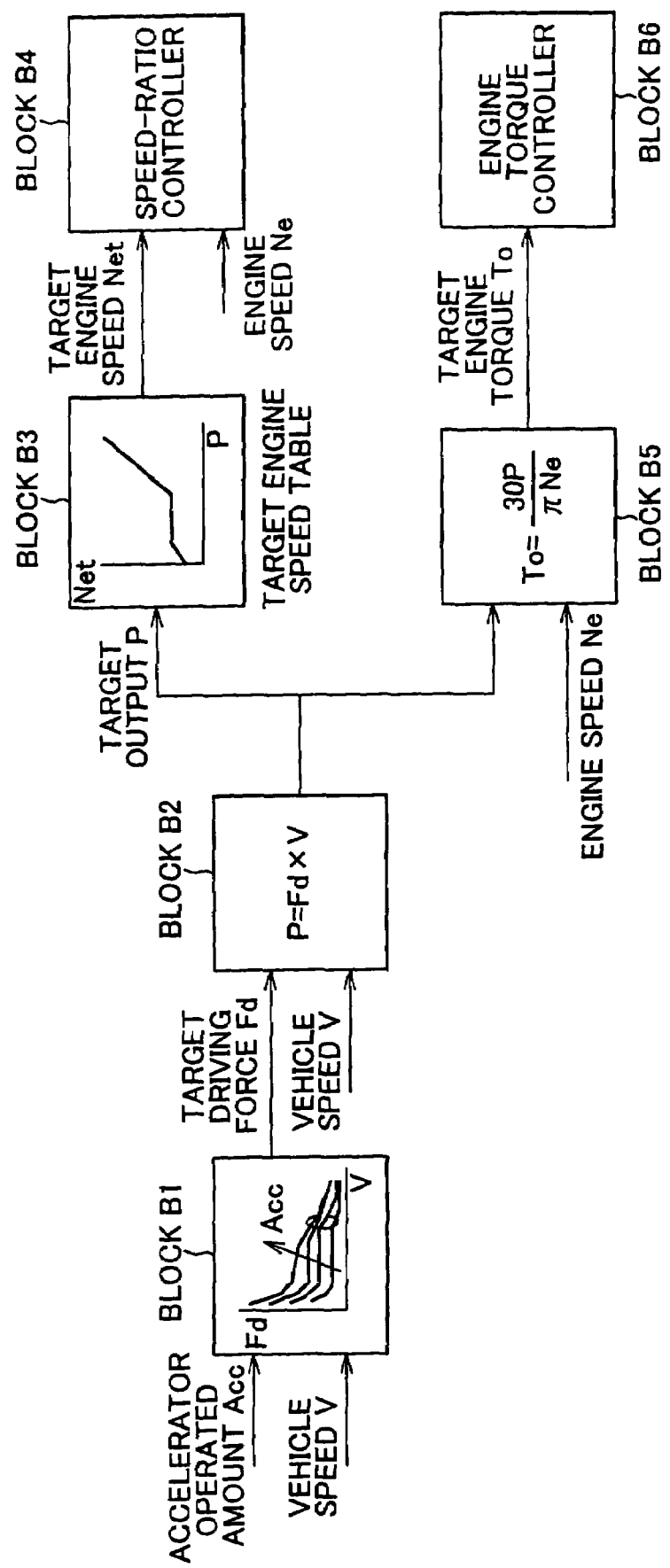
F I G. 4

CONTROL APPARATUS AND METHOD FOR VEHICLE HAVING INTERNAL COMBUSTION ENGINE AND CONTINUOUSLY VARIABLE TRANSMISSION, AND CONTROL APPARATUS AND METHOD FOR INTERNAL COMBUSTION ENGINE

CROSS-REFERENCE TO RELATED APPLICATION

This application is a divisional of Application No. 10/092,800, filed Mar. 8, 2002, which application is incorporated herein by reference in its entirety.

The disclosures of Japanese Patent Applications No. 2001-101692 filed on Mar. 30, 2001, No. 2001-124998 filed on Apr. 23, 2001, and No. 2001-124999 filed on Apr. 23, 2001, each including the specification, drawings and abstract, are incorporated herein by reference in their entireties.

BACKGROUND

The invention relates to control apparatus and method for a vehicle having a driving mechanism in which a continuously variable transmission (hereinafter called "CVT") is coupled to the output side of an internal combustion engine, such as a diesel engine. More particularly, the invention is concerned with control apparatus and method for controlling an output of the internal combustion engine so as to reduce the amount of a pollutant(s) in exhaust gas without deteriorating the fuel economy. The invention also relates to control apparatus and method for an internal combustion engine, such as a diesel engine, and more particularly to control apparatus and method for the internal combustion engine having a catalyst for purifying exhaust gas in an exhaust system.

An internal combustion engine, such as a diesel engine, generates motive power by burning a fuel, and therefore inevitably emits or discharges exhaust gas. In view of global environmental protection, for example, it is desired to purify exhaust gas emitted from the internal combustion engine as much as possible. Examples of pollutants contained in the exhaust gas from internal combustion engine include nitrogen oxides (NOx), hydrocarbon, and particulate matters (PM), such as smoke. To purify the exhaust gas, it is required to reduce the amounts of these pollutants.

NOx is likely to be generated when fuel is burned at a relatively high temperature in an oxidizing atmosphere. This means that NOx is easily generated when the air-fuel ratio (i.e. the ratio of air to fuel in an air-fuel mixture which is burned in the internal combustion engine) is greater than the stoichiometric air-fuel ratio (14.5) and is also in the proximity of that value (i.e. when the air-fuel ratio is in a range of about 16 to 17). Therefore, the air-fuel ratio may be set lower or greater than this range in order to reduce the amount of NOx. However, reducing the air-fuel ratio causes an increase in the amount of fuel supply, resulting in increased fuel consumption or deteriorated fuel economy. Also, increasing the air-fuel ratio makes combustion unstable depending upon the degree of the increase, thereby deteriorating fuel economy. Thus, a fuel consumption characteristic (or fuel economy) and a NOx emission characteristic have a contradictory relationship with each other, which means that an improvement of one of these characteristic results in deterioration of the other characteristic. Such a contradictory relationship is also established between NOx and particulate matters (PM). Namely, if the amount of one of these emissions is reduced excessively, the amount of the other emission increases significantly.

In view of the above-described situation, attempts have been made to achieve good characteristics in terms of both fuel economy and NOx emission, while focusing on the fact that the revolution speed of the internal combustion engine can be controlled as desired to some extent by connecting the CVT to the output side of the internal combustion engine. One example of such attempts is disclosed in Japanese Laid-Open Patent Publication No. 4-255541. In an apparatus disclosed in this publication, fuel consumption characteristics and NOx emission characteristics are obtained with respect to each of a rich operating state in which the air-fuel ratio is set at or smaller (richer) than the stoichiometric air-fuel ratio and a lean operating state in which the air-fuel ratio is set larger (leaner) than the stoichiometric air-fuel ratio. The apparatus then evaluates fuel consumption and NOx emission characteristics with respect to an operating state for obtaining an output that is based on a running condition of the vehicle and a required driving amount, and selects a suitable operating state that satisfies both of desired fuel consumption characteristic and NOx emission characteristic.

The control apparatus as described in the aforementioned publication is able to evaluate which one of lean-burn operation and stoichiometric air-fuel ratio operation (stoichiometric operation) achieves both of desired fuel consumption rate and desired NOx emission rate on the equi-output line corresponding to an actual output, and select an appropriate operating state that achieves better results in terms of fuel consumption and NOx emission. Although this arrangement gives grounds for selecting a lean-burn operation or a stoichiometric operation on the equi-output line, it is not designed to determine the optimal operating state. Namely, in the case where the fuel consumption rate and the amount of NOx emission change with the engine speed and the engine torque, the apparatus is not able to determine the optimal operating point that minimizes both the fuel consumption rate and the amount of NOx emission, and is thus not necessarily able to satisfy practical needs or requirements.

Also, in recent years, regulations for emission of environmental pollutants, such as NOx, are getting much stricter, and, as stated in the aforementioned publication, it is getting difficult to comply with the current emission regulations simply by changing operation conditions or combustion conditions of an internal combustion engine. In order to comply with these stringent NOx regulations, attempts have been made to control an operating state or conditions of the vehicle so as to achieve good characteristics in terms of both the fuel economy and the NOx emission, and also to purify exhaust gas from the internal combustion engine by using catalyst or trapping PM with a filter provided in an exhaust channel.

A NOx storage-reduction catalyst is known as an example of the catalyst. This catalyst absorbs NOx, as nitrogen in the form of a nitrate, contained in exhaust gas generated, for example, when the internal combustion engine is operated in a lean-burn condition with a relatively large air-fuel ratio. With the amount of the absorbed NOx increased to a predetermined amount, the catalyst is exposed to a reducing atmosphere for reaction, so that the stored nitrate-form nitrogen is reduced and released as nitrogen gas. In such a case, oxygen (active oxygen) in a nascent state is generated, thus enabling oxidization of soot attached to the catalyst.

When using this type of catalyst, the atmosphere to which the catalyst is exposed needs to be temporarily controlled to a reducing atmosphere at the time when the amount of NOx stored is increased to a certain level. Known control methods for creating the reducing atmosphere include (a) supplying a reducing agent, such as a fuel or ammonia, into exhaust gas, and (b) reducing the air-fuel ratio by increasing the amount of fuel supplied to the internal combustion engine. Since it is undesirable that ammonia be released from vehicles without reacting with other substance, fuel is normally used as the reducing agent. Thus, when the aforementioned NOx storage-reduction catalyst is used, a certain amount of fuel is consumed to reduce and discharge the NOx stored in the catalyst.

As described above, when the NOx storage-reduction catalyst is used, fuel is consumed for combustion in the internal combustion engine and also for removal of NOx. However, since the known control only takes account of the amount of fuel burned in the internal combustion engine, a further improvement to the known control is to be made so as to improve the fuel economy. Although the apparatus as disclosed in the above-identified publication gives grounds for selecting either a lean-burn operation or a stoichiometric operation on the equi-output line, it is not designed to determine the optimal operating state while taking account of the amount of fuel consumed for removing pollutants, such as NOx, in the exhaust gas. Accordingly, the fuel efficiency or fuel economy is not necessarily optimized when the NOx storage-reduction catalyst is used.

In addition, a so-called emission control device including the filter or the catalyst as mentioned above is not necessarily able to purify exhaust gas without limitation, but its function or activity needs to be restored or recovered. Also, the operation of the internal combustion engine may be influenced by the continuous operating time up to a point of time when a process of restoring the function or activity is required, or the content of the recovery process. It is thus necessary to satisfy both technical requirements, such as fuel economy, for engine operations and requirements for purifying exhaust gas. Nevertheless, effective devices or techniques for achieving both requirements have not been sufficiently developed, nor disclosed in the aforementioned publication.

SUMMARY

It is an object of the invention to provide a control apparatus for a vehicle, which is capable of reducing the amount of pollutants in exhaust gas without deteriorating fuel economy. It is another object of the invention to provide a control apparatus for an internal combustion engine, which is capable of improving fuel economy while taking account of the use of a reducing agent for purifying the exhaust gas. It is a further object of the invention to provide a control apparatus for an internal combustion engine, which is capable of both purifying the emissions and improving fuel economy.

To accomplish the above and/or other object(s), there is provided according to one aspect of the invention a control apparatus for a vehicle including an internal combustion engine capable of controlling an engine load, and a continuously variable transmission coupled to an output side of the internal combustion engine and capable of controlling an output speed of the internal combustion engine. The control apparatus includes an exhaust purifying device disposed in an exhaust system of the internal combustion engine and operable to purify an exhaust gas while consuming a fuel, and a controller that (a) determines a first operating point at which a total fuel consumption amount is minimized as an optimal operating point, the total fuel consumption amount being obtained by adding an amount of a fuel consumed by the exhaust purifying device to an amount of a fuel consumed by the internal combustion engine for generating a required output, and (b) controls the engine load of the internal combustion engine and also controls a speed ratio of the continuously variable transmission so that the internal combustion engine operates at the optimal operating point.

In the vehicle as described above, a fuel is burned upon driving of the internal combustion engine, and a fuel is also consumed at the exhaust purifying device when it purifies the exhaust gas. The above-indicated total fuel consumption amount is equal to a sum of an amount of consumption of the fuel burned in the engine and that of the fuel consumed at the exhaust purifying device. As the optimal operating point of the engine, therefore, an operating point at which the total fuel consumption amount for generating a required output is minimized is determined. For example, the operating point is determined so as to minimize, with respect to a required output, a total fuel consumption amount obtained by adding a fuel consumption amount when the engine is operated at a certain output for a certain period of time, and a fuel consumption amount required for reducing the amount of a certain pollutant in the exhaust gas emitted during the above period of time, down to its regulation value.

In order to operate the engine at the operating point, the control apparatus controls controllable amounts or parameters, such as a fuel supply quantity or an intake air quantity of the engine, and an output speed of the engine that can be changed by the continuously variable transmission. As a result, the exhaust gas can be purified by the exhaust purifying device, thereby making it possible for the exhaust to clear a more strict regulation value, and avoiding deterioration of the fuel economy.

According to a second aspect of the invention, there is provided a control apparatus for a vehicle including an internal combustion engine capable of controlling an engine load, and a continuously variable transmission coupled to an output side of the internal combustion engine and capable of controlling an output speed of the internal combustion engine. The control apparatus includes an exhaust purifying device that is disposed in an exhaust system of the internal combustion engine and is operable to purify an exhaust gas while consuming a fuel. When the exhaust purifying device is not effectively functioning, a controller of the control apparatus places the internal combustion engine in an operating state that enables generation of a required torque while giving higher priority to reduction in an amount of a pollutant in the exhaust gas than to reduction in a fuel consumption amount. When the exhaust purifying device is effectively functioning, the controller places the internal combustion engine in an operating state that enables generation of a required torque while giving higher priority to reduction in the fuel consumption amount to reduction in the amount of the pollutant in the exhaust gas.

In the vehicle as described above, a fuel is burned upon driving of the internal combustion engine, and a fuel is also consumed at the exhaust purifying device when it purifies the exhaust gas. When the exhaust purifying device is not effectively functioning, the engine is operated with a higher priority given to reduction in the amount of the pollutant in the exhaust gas than to reduction in the fuel consumption amount. When the exhaust purifying device is effectively functioning, on the other hand, an operating state that leads to a reduction in the fuel consumption amount is selected in spite of a relative increase in the amount of the pollutant emitted from the engine, and a command is generated to drive the engine in this operating state. In this case, the pollutant is removed by the effectively functioning exhaust purifying device, and therefore the amount of emission of the pollutant from the vehicle is reduced. Thus, emission of the pollutant from the engine may be suppressed, or the pollutant may be effectively removed by the exhaust purifying device, thus making it possible for the vehicle to comply with more strict exhaust regulations.

According to a third aspect of the invention, there is provided a control apparatus for a vehicle including an internal combustion engine capable of controlling an engine load, and a continuously variable transmission coupled to an output side of the internal combustion engine and capable of controlling an output speed of the internal combustion engine, wherein the internal combustion engine is operated at an operating point defined by the engine load and the output speed. A controller of the control apparatus sets, as a target operating point, an operating point selected from a plurality of operating points corresponding to a plurality of outputs of the engine, each of the plurality of operating points having substantially the same ratio of a rate of change in the fuel consumption amount to a rate of change in the amount of the pollutant in the exhaust gas, which ratio is obtained when an operating state of the engine is changed with an output of the engine being kept constant. The controller then places the internal combustion engine in an operating state represented by the target operating point set for a required output of the engine.

In the control apparatus as described just above, the ratio of the rate of change in the fuel consumption amount to the rate of change in the amount of the pollutant in the exhaust gas is obtained when the engine load, the engine speed, and the like, are changed with an output of the engine being kept constant. The target operating point is set to a point selected from a plurality of operating points corresponding to a plurality of outputs of the engine, which have substantially the same ratio. Then, the internal combustion engine is controlled to operate at the target operating point for the required output. As a result, the fuel consumption amount and the amount of the pollutant emitted from the vehicle can be reduced.

According to a fourth aspect of the invention, there is provided a control apparatus for a vehicle including an internal combustion engine capable of controlling an engine load, and a continuously variable transmission coupled to an output side of the internal combustion engine and capable of controlling an output speed of the internal combustion engine, wherein the internal combustion engine is operated at an operating point defined by the engine load and the output speed. A controller of the control apparatus sets, as a target operating point, an operating point on a line on which an amount of a pollutant contained in an exhaust gas is substantially constant with respect to each output of the engine, when the internal combustion engine is in a low output state in which the amount of the pollutant emitted is equal to or smaller than a predetermined reference value. The controller then places the internal combustion engine in an operating state represented by the target operating point set for a required output of the engine.

When the internal combustion engine operates with a lower output, namely, when the engine is in a low output state in which the amount of emission of a certain pollutant is equal to or less than a predetermined value, an operating point is set, upon a change of the required output, so that the amount of emission of the pollutant is made constant, and the engine is operated at the set operating point. In this case, the fuel economy is less likely to deteriorate. Consequently, the engine can be operated to produce a reduced amount of the pollutant, while assuring good fuel economy.

According to a fifth aspect of the invention, there is provided a control apparatus for an internal combustion engine in which a catalyst adapted to remove a pollutant contained in an exhaust gas is provided in an exhaust system, the catalyst being adapted to store the pollutant and reduce and release the pollutant in the presence of a reducing agent. A controller of the control apparatus reduces an excess air ratio of an air-fuel mixture to be burned in the internal combustion engine when the reducing agent is supplied to the catalyst. In one preferred embodiment of the invention, the controller reduces the excess air ratio without changing an output of the engine.

In the arrangement as described above, an exhaust gas emitted from the engine by burning an air-fuel mixture is supplied to the catalyst provided in the exhaust system, so that a certain pollutant is removed by the catalyst. More specifically, the pollutant is once absorbed or stored in the catalyst, and is then reduced by a reducing atmosphere and released. While the reducing atmosphere is created by supplying a reducing agent, the excess air ratio of the air-fuel mixture to be burned in the engine is reduced at the time when the reducing agent is supplied. Although the reduction in the excess air ratio involves an increase in the amount of fuel supplied to the engine, the reducing agent may be supplied so as not to change the output of the engine. Since the atmosphere provided at the time of supply of the reducing agent has a low degree of oxidizing characteristic, the reducing agent is prevented or restricted from being oxidized before reducing the pollutant. Consequently, the fuel consumption amount, including that of the reducing agent, can be advantageously reduced as a whole.

According to a sixth aspect of the invention, there is provided a control apparatus for an internal combustion engine that causes a first emission and a second emission to be generated upon combustion of a fuel, wherein an amount of the second emission in an exhaust gas increases as an operating state of the engine is changed so as to reduce an amount of the first emission in the exhaust gas. A controller of the control apparatus determines an emission history of one of the first and second emissions during an operation of the internal combustion engine, and changes the operating state of the internal combustion engine based on the determined emission history of the one of the first and second emissions.

In the control apparatus as described above, the emission history of the above-indicated one emission may be determined by calculating a total amount of the one emission or calculating a total amount of each of the first and second emissions. Also, the operating state of the engine may be changed so as to reduce an amount or a total amount of the one emission, or to reduce a total amount of one of the emissions whose total amount has been increased. Furthermore, the operating state of the engine may be changed from an operating state in which the fuel consumption amount is minimized, to another operating state, namely, to such an operating state that satisfies any one of the above requirements. Moreover, the operating state may be changed so as not to change the output of the engine (so as to keep the output constant).

If the exhaust gas containing the above emissions is continuously discharged during an operation of the internal combustion engine, the emission history of the emission(s) is determined, and the operating state of the engine is changed based on the result of the determination. For example, a total amount of a certain emission is increased, the operating state is changed so as to reduce an amount of the emission discharged from the engine. Here, the operating state may be represented by the engine load, the engine speed, and the like. Before changing, the operating state of the engine may be set to an operating point at which the fuel consumption amount is minimized. Thus, the operating state can be changed from the so-called optimal operating point with good fuel economy, so as to promote purification of the exhaust gas while assuring improved fuel economy.

According to a seventh aspect of the invention, there is provided a control apparatus for an internal combustion engine that causes a first emission and a second emission to be generated upon combustion of a fuel, wherein an amount of the second emission in an exhaust gas increases as an operating state of the engine is changed so as to reduce an amount of the first emission in the exhaust gas, and wherein an emission control device is provided in an exhaust passage so as to purify an exhaust gas by reducing at least one of the first emission and the second emission. A controller of the control apparatus determines an emission control capability with which the emission control device reduces an amount of one of the first emission and the second emission, and changes an operating state of the internal combustion engine based on the determined emission control capability.

In the control apparatus as described above, the emission control device may be a catalyst that reduces the amounts of NOx and particulate matters thereby to purify the exhaust gas. The emission control capability may be determined based on a total value of a continuous operating time of the internal combustion engine, or another total value corresponding to this total value. The emission control capability may also be determined based on an amount of a certain emission stored by the emission control device. Furthermore, the operating state may be changed so as to reduce the amount of the above-indicated one emission that is controlled or treated by the emission control device as the emission control capability is lowered. The controller may further determine the emission history of one or more of the emissions, and may change the operating state of the engine based on the emission history and the emission control capability as described above. In this case, the emission history may be determined by calculating a total amount of each emission, and the emission control capability may be determined with respect to each of the emissions treated by the emission control device. In addition, the operating state of the engine may be changed based on the total amount of each emission and the emission control capability with respect to each emission. Furthermore, the operating state of the engine may be changed from an operating state in which the fuel consumption amount is minimized, to another operating state, namely, to such an operating state that satisfies any one of the above requirements. Moreover, the operating state may be changed so as not to change the output of the engine (so as to keep the output constant).

In the internal combustion engine as described above, one or more of the emissions in the exhaust gas generated during an operation of the engine is/are reduced by the emission control device, so that the exhaust gas is purified. The emission control capability of the emission control device gradually changes as emission control continues, and the controller determines the emission control capability that has changed. Then, the operating state of the internal combustion engine is changed based on the determined emission control capability. For example, the engine load or speed is increased or decreased so as to reduce an amount of the emission for which the emission control capability has been reduced. Before changing, the operating state of the engine may be set to an operating point at which the fuel consumption amount is minimized. Thus, the operating state can be changed from the optimal operating point with good fuel economy, so as to promote purification of the exhaust gas while assuring improved fuel economy.

According to an eighth aspect of the invention, there is provided a control apparatus for an internal combustion engine that generates particulate matters upon combustion of a fuel, wherein an emission control device that controls emission of the particulate matters is provided in an exhaust passage. A controller of the control apparatus determines whether the emission control device is in a predetermined clogged state in which the emission control device is at least partially clogged by the particulate matters; and changes an operating state of the internal combustion engine so as to mitigate the clogged state of the emission control device when it is determined that the emission control device is in the predetermined clogged state.

The controller as indicated above may determine the clogged state based on a pressure in the exhaust passage or an air-fuel ratio of an air-fuel mixture to be burned. Also, the operating state of the engine may be changed so as to reduce an amount of emission of the particulate matters, or so as to increase an exhaust temperature in the exhaust passage. Furthermore, the operating state of the engine may be changed from an operating state in which the fuel consumption amount is minimized, to another operating state. Moreover, the operating state may be changed so as not to change the output of the engine (so as to keep the output constant).

In the internal combustion engine as described above, particulate matters produced by combustion of a fuel are trapped or caught by the emission control device provided in the exhaust passage, and are subjected to oxidation or other treatment and removed. The emission control device may be brought into a clogged state due to a mismatch between the amount of PM trapped and the amount of PM removed. If the emission control device is judged as being in a clogged state, the operating state of the engine is changed so as to mitigate or eliminate the clogged state. For example, the operating state of the engine is changed so as to reduce an amount of emission of the particulate matters that caused the clogging, or so as to remove the particulate matters attached to the emission control device. As a result, the particulate matters are prevented in advance from being discharged as they are. Furthermore, by changing the operating state from a state in which the fuel consumption amount is minimized, deterioration of the fuel economy due to the change of the operating state can be suppressed, assuring improved fuel economy.

According to a ninth aspect of the invention, there is provided a control apparatus for an internal combustion engine including an exhaust gas recirculation system adapted to return a part of an exhaust gas emitted upon combustion of a fuel to an intake side of the engine. A controller of the control apparatus determines whether the exhaust gas recirculation system is in a predetermined clogged state, and changes an operating state of the internal combustion engine so as to mitigate the clogged state of the exhaust gas recirculation system when it is determined that the exhaust gas recirculation system is in the predetermined clogged state.

The controller as indicated above may determine the clogged state based on a pressure in the exhaust passage or an air-fuel ratio detected by a certain sensor. Also, the operating state of the engine may be changed so as to reduce an amount of emission of the particulate matters from the engine, or so as to increase an amount of the exhaust flowing through the exhaust gas recirculation system. Furthermore, the operating state of the engine may be changed from an operating state in which the fuel consumption amount is minimized, to another operating state. Moreover, the operating state may be changed so as not to change the output of the engine (so as to keep the output constant).

In the internal combustion engine as described above, a part of the exhaust gas emitted due to combustion of a fuel is returned to the intake side of the engine, whereby the combustion temperature is reduced. As an exhaust recirculating operation is continuously performed, the exhaust gas recirculation system may be at least partially clogged. If the clogged state is determined, the operating state of the engine is changed so as to mitigate or eliminate the clogged state. For example, the engine load, the engine speed and/or other operating condition(s) may be changed so as to oxidize and remove a substance that causes the clogging, or blow off the substance by using gas flow, thereby to reduce an amount of the substance produced in the engine. In this case, the fuel economy may be improved by changing the operating state from a standard operating state in which the fuel consumption amount is minimized. Also, by changing the operating state without changing the output of the engine, otherwise possible changes in the behavior of the vehicle provided with the engine can be prevented or suppressed.

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein:

FIG. 4 is a block diagram showing a control scheme in which a CVT is used and the engine speed and the engine torque are separately controlled;

DETAILED DESCRIPTION OF EMBODIMENTS

Figure 2:
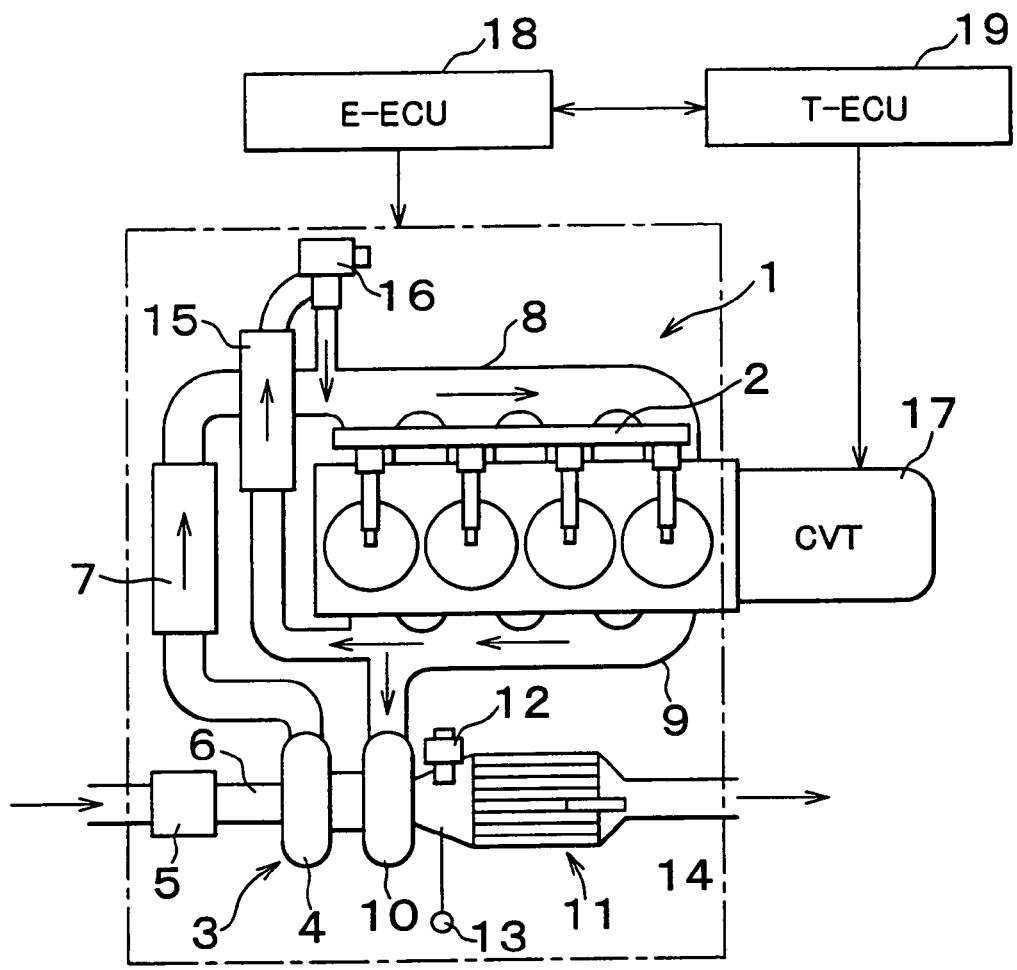
FIG. 2 is a view schematically showing an example of a power train system of a vehicle, in which is installed an internal combustion engine to be controlled by a control apparatus according to one exemplary embodiment of the invention.

Hereafter, some exemplary embodiments of the invention will be described in detail with reference to the drawings. An internal combustion engine to be controlled by a control apparatus for a vehicle or an engine according to the exemplary embodiments is a power generating device, such as a diesel engine and a gasoline engine, for generating power by burning a fuel. For example, the internal combustion engine is installed on a motor vehicle, such as an automobile, and is primarily used as a power source for running the vehicle. FIG. 2 schematically illustrates an example of a direct-injection type diesel engine 1 (hereafter simply called "engine") used as a vehicle power source. The engine 1 is of the direct-injection type in which the fuel is injected directly into cylinders, and is provided with an electronically controlled fuel injection system 2 of a common rail type, which permits fuel injection at a high pressure. The electronically controlled fuel injection system 2 of this embodiment may have a known structure.

The engine 1 shown in FIG. 2 is provided with a turbocharger 3, namely, a supercharger with an exhaust-gas turbine. The turbocharger 3 includes a compressor 4 and a turbine 10. An intake pipe 6 with an air cleaner 5 disposed therein is connected to an inlet of the compressor 4, and an intake manifold 8 is connected to an outlet of the compressor 4, via an intercooler 7 for reducing a temperature of intake air.

An exhaust manifold 9 connected to respective cylinders is connected to an inlet of the turbine 10 of the turbocharger 3. Further, a catalytic converter 11 having an exhaust purifying catalyst is connected to an outlet of the turbine 10. In addition, an air-fuel ratio sensor 12 and a pressure sensor 13 are disposed upstream of the catalytic converter 11. The pressure sensor 13 serves to detect a pressure of exhaust gas flowing into the catalytic converter 11. The catalytic converter 11 is also provided with a temperature sensor 14 for detecting a catalyst temperature. In the engine 1 as shown in FIG. 2, an exhaust channel extends from the exhaust manifold 9 through the catalytic converter 11 to an outlet (not shown) that is open to the atmosphere.

Here, the exhaust purifying catalyst will be explained. In the engine 1 as shown in FIG. 2, a NOx storage-reduction type catalyst is used. The catalyst of this type has a function of storing NOx that is one of pollutants contained in exhaust gas as nitrogen in the form of a nitrate when it is exposed to an oxidizing atmosphere. The catalyst also has a function of reducing the stored nitrate-form nitrogen in a reducing atmosphere, and discharging or releasing it as nitrogen gas. In the meantime, active oxygen is generated during storage and reduction of NOx. The catalyst also has a function of oxidizing and removing soot (PM: particulate matters) adhering to its surface, by using the active oxygen and oxygen in exhaust gas. To enable the catalyst to perform these functions, the atmosphere to which the exhaust purifying catalyst is exposed needs to be switched between an oxidizing atmosphere and a reducing atmosphere at certain time intervals. The switching of the atmosphere can be accomplished by switching the air-fuel ratio between a lean air-fuel ratio and a rich air-fuel ratio. Namely, the atmosphere to which the catalyst is exposed may be changed by increasing an amount of the air relative to the fuel or increasing an amount of the fuel relative to the air. The air-fuel ratio may be only temporarily controlled to be on the rich side so that nitrides are released from the exhaust purifying catalyst, and this temporary operation for making the air-fuel ratio rich is called "rich spike".

Furthermore, the engine 1 shown in FIG. 2 has an exhaust gas recirculation system for reducing NOx in the exhaust gas. The exhaust gas recirculation system includes an EGR cooler 15 for cooling exhaust gas to be recirculated, and an EGR valve 16 for executing and terminating (or interrupting) recirculating operations and keeping a recirculation rate (EGR rate) constant. The exhaust manifold 9 and the intake manifold 8 are connected with each other, with the EGR cooler 15 and the EGR valve 16 interposed therebetween.

A continuously variable transmission 17 (hereinafter simply called "CVT") is coupled to the output side of the engine 1. The CVT 17 is capable of continuously changing the speed ratio. For example, a pulley-and-belt type CVT or a traction-type (toroidal-type) CVT may be used as the CVT 17.

An electronic control unit (E-ECU) 18 for an engine is provided for electronically controlling the fuel injection quantity and injection timing of the engine 1, execution and termination (or interruption) of exhaust gas recirculation, the opening amount of a throttle valve (not shown in FIG. 2), and the like. Also, an electronic control unit (T-ECU) 19 for a transmission is provided for controlling the CVT 17. The electronic control units 18, 19, which mainly include microcomputers, are designed to control the throttle opening and the fuel injection quantity (i.e., engine load) or the speed ratio of the CVT 17 (i.e., engine speed), based on a required output represented by an operated amount of an accelerator pedal, the vehicle speed, the engine coolant temperature, the oil temperature of the CVT 17, signals received from the above-indicated sensors 12, 13, 14, and so forth.

The engine 1 generates, as a driving force, a mechanical energy that arises from combustion of a fuel that is injected into each cylinder. The quantity of the fuel consumed for this operation is controlled to the minimum within a range in which the require output is satisfied. A pollutant, such as NOx resulting from fuel combustion within the cylinders, is adsorbed by and stored in the catalyst in the catalytic converter 11. Before the catalyst is saturated with the pollutant, a reducing atmosphere is created by increasing the amount of fuel in the exhaust gas. With the catalyst exposed to the reducing atmosphere, nitrate-form nitrogen stored in the catalyst is reduced and is discharged or released as nitrogen gas. Namely, the amount of fuel supply is increased and the fuel is consumed for purifying the exhaust gas. As stated above, the fuel is consumed for purifying the exhaust gas, in other words, for reducing the amount of air pollutants emitted from the vehicle, as well as for driving the engine 1. The fuel used for purifying the exhaust gas may also be called a reducing agent or a reductant for creating a reducing atmosphere to which the catalyst is exposed.

It will be understood from the above description that the fuel consumption amount per unit output is the total or sum of the amount of fuel consumed for driving the engine 1 and the amount of fuel consumed for purifying the exhaust gas. A control apparatus according to one embodiment of the invention controls the engine 1 and the CVT 17 so as to minimize the total fuel consumption amount. More specifically, the intake air quantity and/or the fuel injection quantity of the engine 1 is/are controlled so as to provide a torque corresponding to the required output, and the speed ratio of the CVT 17, or the engine speed, is controlled so as to achieve the required output with the minimum fuel consumption.

An operating point of the engine 1 at which the total fuel consumption is minimized is determined as follows. An emission regulation value for a pollutant, such as NOx, emitted from the vehicle along with exhaust gas is defined as an amount of the pollutant emitted when the vehicle is driven according to a predetermined running mode. The running mode is determined in terms of a vehicle speed, a period of time in which a certain vehicle speed is maintained, and the like. Thus, the total fuel consumption in the running mode, which will also be called "mode fuel consumption (g) F", is determined according to the following equation (1):

$$F = \Sigma ti*pi*si + tidl*sidl + k(\Sigma ti*pi*ni + tidl*nidl - Nt) \quad (1)$$

In this equation, pi is an output (kW) of the engine 1, ti is a period of time (h) for which the output is kept at pi during mode running, tidl is a duration (h) of idling, and si is a specific fuel consumption (g/kWh) on an equi-output line of the output pi, sidl is a specific fuel consumption (g/h) during idling, ni is an amount of NOx emission (g/kWh) on the equi-output line of the output pi, and nidl is an amount of NOx emission (g/h) during idling. In the same equation, k is the ratio (fuel for rich spike/NOx) of a required fuel amount for the above-mentioned rich spikes for creating a reducing atmosphere to which the exhaust purifying catalyst is exposed, to an amount of NOx to be reduced during the rich spikes, and Nt is a target amount of NOx emission (a predetermined amount of NOx emission that is equal to or smaller than the emission regulation value).

In the right side of the above equation (1), the idling fuel consumption (tidl*sidl), the amount of idling NOx emission (tidl*nidl), and the target NOx emission Nt are constant, irrespective of a running condition of the vehicle. Thus, the equation (1) can be rewritten into the following equation (2):

$$F = \Sigma ti*pi*si + k*\Sigma ti*pi*ni \quad (2)$$
$$= \Sigma ti*pi*(si + k*ni)$$

Figure 3:
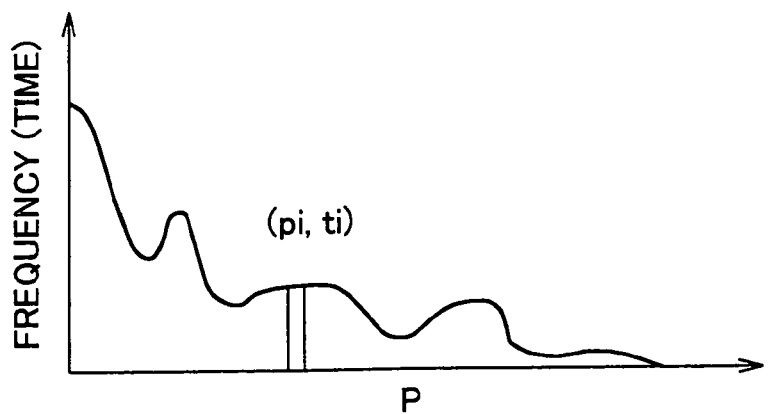
FIG. 3 is a graph showing an example of a running mode of the vehicle.

In the equation (2), pi is determined depending upon the engine 1 installed on the vehicle, and the running time ti at a certain output pi is determined depending upon the running mode that defines the emission regulation value for a pollutant such as NOx. An example of running mode is shown in the diagram of FIG. 3. With the output pi and the running time ti thus determined, the mode fuel consumption F can be minimized by controlling operating conditions of the engine 1 such that (si+k*ni) in the right side of the equation (2) is minimized. That is, the minimization of the mode fuel consumption can be achieved simply by selecting an operating point at which the sum of the specific fuel consumption on the equi-output line corresponding to the required output and the value obtained by converting the amount of NOx emission on the same equi-output line into that of the fuel is minimized, and controlling the engine load and the engine speed so as to operate the engine 1 at the selected operating point.

Figure 1:
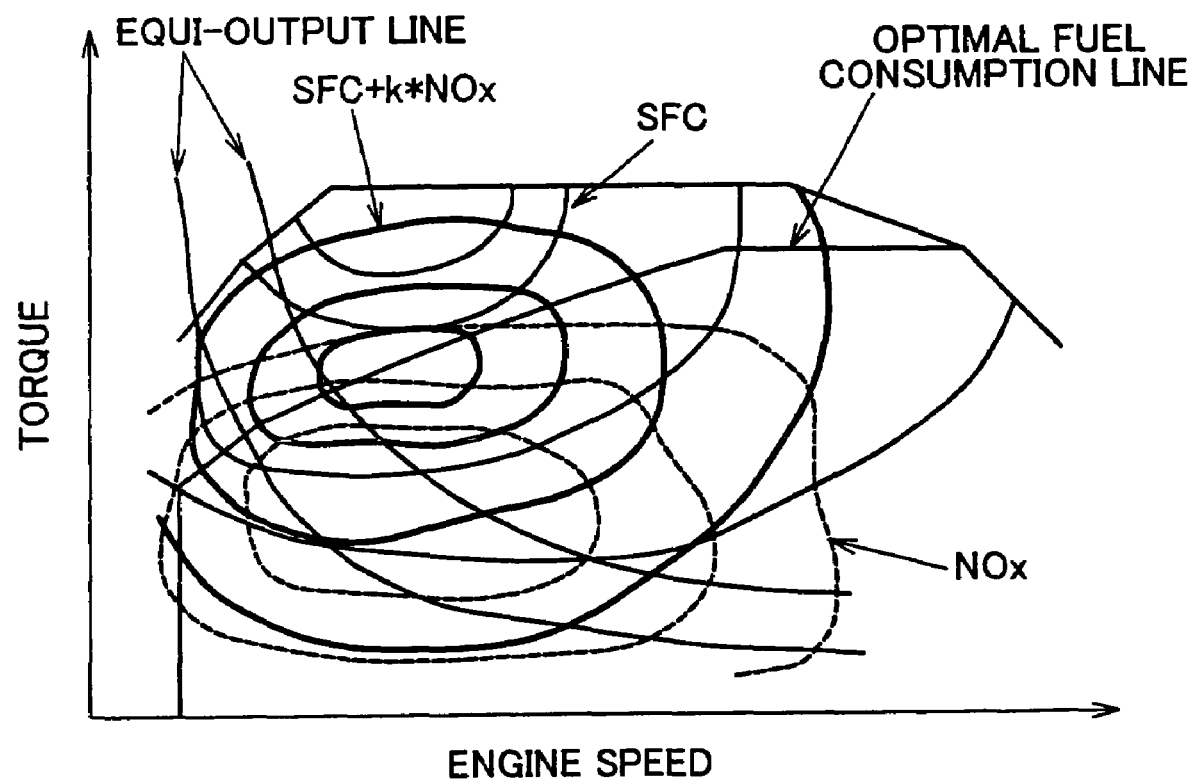
FIG. 1 is a graph showing an example of an optimal fuel consumption line obtained by adding a specific fuel consumption on an equi-output line and a fuel consumption quantity corresponding to NOx emission.

Meanwhile, since the output of the engine 1 is the product of torque and engine speed, equi-output lines are plotted as shown in FIG. 1 with respect to torque and engine speed as parameters. In the diagram of FIG. 1, thin solid lines represent the specific fuel consumption SFC, and dashed lines represent the amount of NOx emission. Each of the thin solid lines is drawn by connecting points having the same specific fuel consumption SFC, and each of the dashed lines is drawn by connecting points having the same amount of NOx emission. Thus, the thin solid lines and the dashed lines are so-called contour lines on which the specific fuel consumption SFC or the amount of NOx emission is at the same value. Also, the value (SFC or NOx) decreases toward the center of each set of the contour lines. As shown in FIG. 1, the contour lines for the NOx emission is on the lower torque side (the lower load side) as compared with the contour lines for the specific fuel consumption SFC. Therefore, when the amount of fuel consumed for providing a certain output is reduced, the NOx emission increases, resulting in an increase in the amount of fuel required for removing NOx. Thus, the fuel economy and the NOx emission have a contradictory relationship.

The above-indicated (si+k*ni) corresponding to the total fuel consumption rate is represented by thick solid lines in FIG. 1. A line that connects the minimum values of the total fuel consumption rates is an optimal fuel consumption line on which the fuel consumption is minimized while at the same time necessary storage and reduction of NOx can be carried out sufficiently. Also, since the controllable minimum engine speed is fixed, the optimal fuel consumption line is turned into a straight line at the minimum engine speed.

The control apparatus according to an exemplary embodiment of the invention controls the engine 1 and the CVT 17 so as to drive the engine 1, at least in a normal running state, at the optimal operating point determined as an intersection of the equi-output line corresponding to the required output represented by the accelerator operated amount, and the aforementioned optimal fuel consumption line. The control method is similar to a known control method for controlling an engine and a CVT, except for a manner of determining a target engine speed Ne. One example of the control method is illustrated in FIG. 4.

Referring to FIG. 4, a target driving force Fd is determined based on an accelerator operated amount Acc and a vehicle speed V (Block B1). Here, the accelerator operated amount Acc is control data obtained by electrically processing the amount of depression of an accelerator pedal (not shown), and is used as a parameter representing a request for acceleration or deceleration, or a required driving force. Alternatively, a signal indicative of a request for driving under cruise control with which the vehicle speed is kept constant may be used as a parameter that replaces the accelerator operated amount Acc. Similarly, the vehicle speed V may be represented by a speed of rotation of a suitable rotary member which has a one-to-one correspondence to the vehicle speed V.

The determination of the target driving force Fd based on the accelerator operated amount Acc and the vehicle speed V is carried out based on a map that is prepared in advance. Specifically, a relationship between the vehicle speed V and the driving force Fd is mapped in advance, using the accelerator operated amount Acc as a parameter. In this case, the driving force Fd is determined so as to reflect characteristics of the vehicle in question. Then, the target driving force Fd is determined based on the map.

In Block B2 shown in FIG. 4, a target output P is calculated based on the target driving force Fd obtained in Block B1 and the current vehicle speed V. In other words, the target output P is the product of the target driving force Fd and the vehicle speed V.

In order to control the speed ratio of the CVT 17, the target engine speed Net corresponding to the target output P is obtained in Block B3 shown in FIG. 4. As mentioned above, the engine 1 is controlled according to the optimal fuel consumption line in a normal running state of the vehicle, and therefore an operating state in which the target output P is reached is represented by an operating point that lies on the optimal fuel consumption line. Namely, since the engine 1 is controlled into a state that is based on the optimal fuel consumption line when the target output P is reached, the target engine speed Net is determined by using a target engine speed table (or graph) which defines a relationship between the output and the engine speed based on the optimal fuel consumption line shown in FIG. 1.

Based on the target engine speed Net and the actual engine speed Ne detected, a speed-ratio controller controls a speed ratio of the CVT 17 in Block B4 so that the actual engine speed becomes equal to the target engine speed. In this embodiment, a shift controller is provided by the above-indicated electronic control unit for the transmission as shown in FIG. 2.

In order to control the engine 1, on the other hand, a target engine torque To is determined based on the target output P and the current engine speed Ne (Block B5). This operation is performed by, for example, dividing the target output P by the current engine speed Ne. The equation shown in Block B5 in FIG. 4 involves processing for integrating units. Here, the engine speed Ne may be replaced by an angular velocity of an output shaft of the engine 1.

To achieve the target engine torque To thus obtained, an engine torque controller controls the engine 1 in Block B6. More specifically, the electronic control unit (E-ECU) 18 for an engine as shown in FIG. 2 operates to control the fuel injection quantity or the opening angle of an electronic throttle valve (not shown).

The operating point representing the operating state of the engine 1 established by controlling the output torque and the engine speed as described above lies on the optimal fuel consumption line corresponding to the required output. As a result, the engine 1 is operated such that the fuel consumption and NOx emission are both minimized, while at the same time the amount of NOx as a pollutant in exhaust gas can be reduced to a target value by the catalytic converter 11. In other words, the fuel economy can be improved, while achieving compliance with more stringent exhaust regulations concerning pollutants, such as NOx, in the exhaust gas.

Meanwhile, when exhaust gas from the engine 1 is subjected to so-called after treatment at the catalytic converter 11, the catalyst temperature needs to be kept equal to or higher than an activation temperature in order to permit the catalytic converter 11 to perform its intended function. The catalyst temperature is raised to or maintained at a high level, utilizing heat of the exhaust gas and heat generated by reactions in the catalyst. If the exhaust gas emitted from the engine 1 has a low temperature, the catalyst temperature in the catalytic converter 11 may be lowered. In such a case, if the engine 1 is operated at the operating point on the optimal fuel consumption line as shown in FIG. 1, the activity of the exhaust purifying catalyst may be lowered, and thus the amount of the pollutants released from the vehicle may increase.

Figure 5:
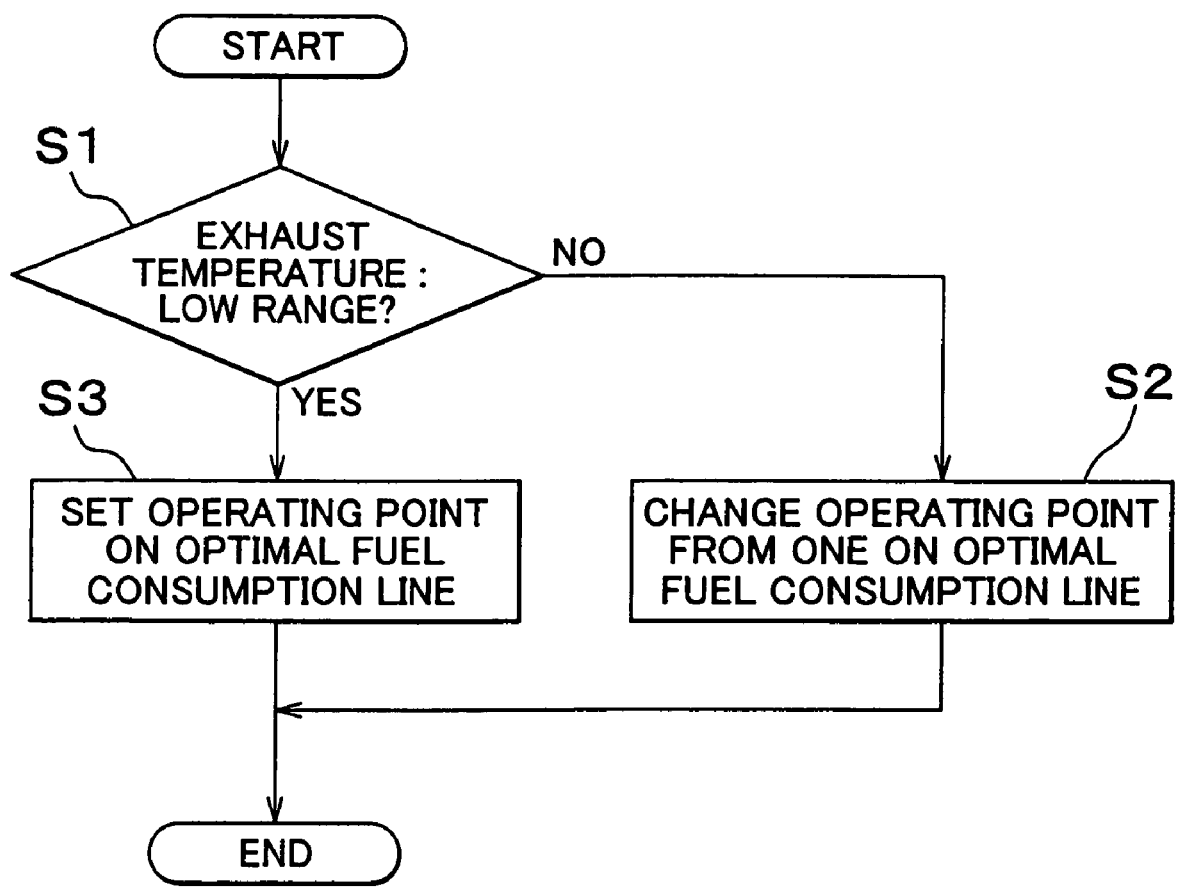
FIG. 5 is a flowchart for explaining a control scheme in which an operating point is shifted based on an exhaust gas temperature.

To avoid the above-described unfavorable situation, when the engine exhaust temperature is in a low range or region, the operating point of the engine 1 is set to a point that deviates from the operating point on the optimal fuel consumption line as described above. FIG. 5 is a flowchart for explaining a control scheme for setting the operating point of the engine 1 in this situation. Initially, in step S1, it is determined whether the engine exhaust temperature is in a low range. This determination may be based on, for example, a temperature detected by a temperature sensor provided in the exhaust system of the engine 1 or a coolant temperature sensor. Alternatively, the engine exhaust temperature may be estimated based on a load, such as a throttle opening or a fuel injection amount.

If a negative decision (NO) is obtained in step S1, the exhaust temperature is determined as not being particularly low. In this case, step S2 is executed to set the operating point of the engine 1 as usual to a point that lies on the optimal fuel consumption line as shown in FIG. 1. Then, the speed ratio of the CVT 17 is controlled so as to provide an engine speed that is determined based on the optimal fuel consumption line.

To the contrary, if an affirmative decision (YES) is obtained in step S1, the operating point of the engine 1 is set to a point that is different from the operating point on the optimal fuel consumption line shown in FIG. 1. For example, if the engine speed is equal to or lower than a predetermined value, the engine 1 is operated at an operating point that is shifted to the higher-load, lower-speed side with respect to the operating point on the optimal fuel consumption line. The thick solid line A in FIG. 6 connects the operating points plotted for the situation where the exhaust temperature is low.

By changing the operating point from a certain point on the optimal fuel consumption line to a corresponding point (of the same equi-output line) on the solid line A, the temperature of the exhaust gas from the engine 1 increases. As a result, the exhaust catalyst receives heat from the exhaust gas, and the catalyst midbed temperature is increased, whereby the catalyst is kept activated or its activation is promoted. The diesel engine, in particular, is driven in an operating region having a relatively low excess air ratio, which is established by increasing a fuel supply (or a fuel injection quantity), and therefore the exhaust temperature is more effectively raised. Accordingly, the operating time of the engine in which the exhaust catalyst is in a poorly activated condition is reduced, and therefore the total amount of pollutants discharged from the vehicle with the exhaust gas can be reduced even if the operating point is shifted to the higher-load lower-speed side.

Another example of shifting the operating point is that, when the engine speed is equal to or lower than a predetermined value, the engine 1 is operated at an operating point located on the lower-load higher-speed side with respect to a corresponding operating point (of the same equi-output line) on the optimal fuel consumption line. The thick solid line B in FIG. 6. connects the operating points plotted for the situation where the engine speed is relatively low.

By shifting the operating point from a point on the optimal fuel consumption line to a corresponding point (of the same output) on the solid line B, the fuel economy is deteriorated, but the operating point comes closer to a point at which the amount of the NOx emission is minimized. Therefore, even if a NOx removal capability of the exhaust catalyst is lowered, the amount of NOx generated by the engine 1 is reduced, resulting in a reduction in the total amount of NOx discharged from the vehicle.

Figure 6:
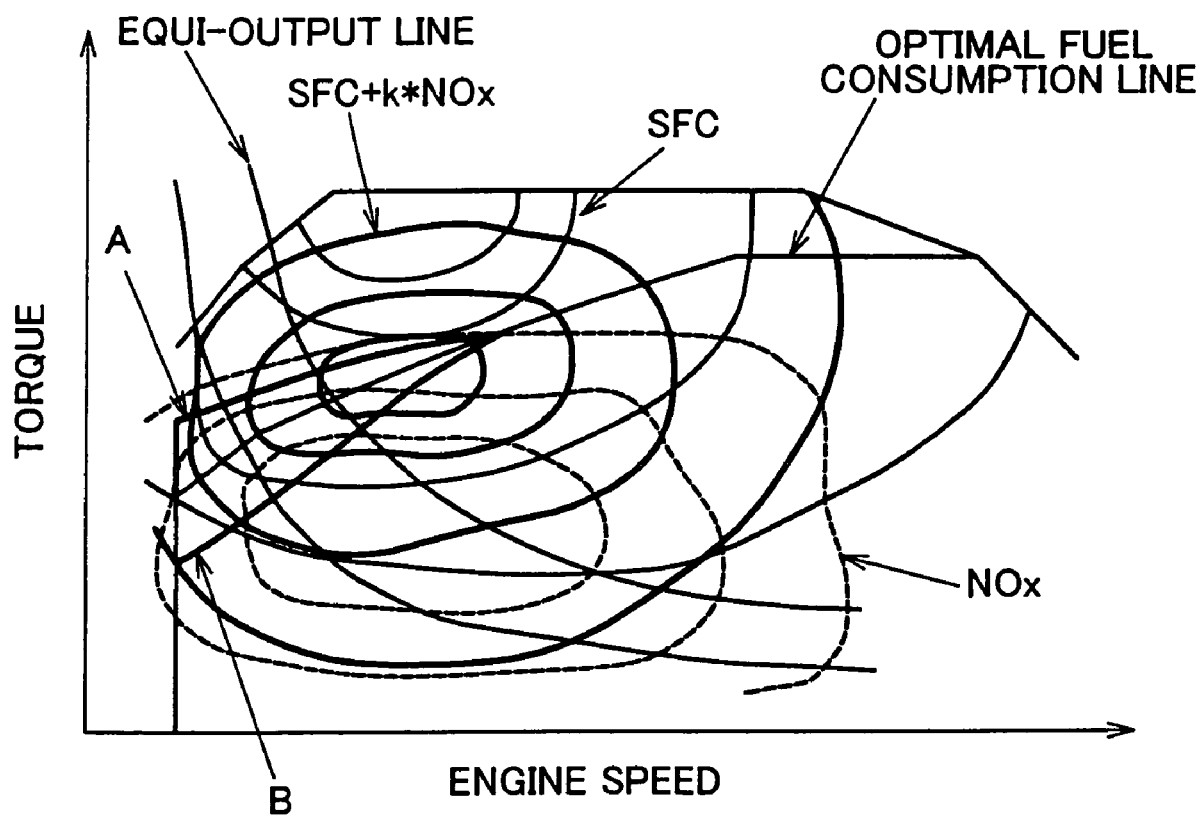
FIG. 6 is a graph showing an example of an optimal fuel consumption line (engine operating line) when it is changed based on an exhaust gas temperature.

The control for shifting the operating point onto the solid line A in FIG. 6 is opposite to the control for shifting the operating point to the solid line B in FIG. 6. However, either of these control operations, whichever is advantageous, may be selected for each type of the engine 1 or vehicle, since the specific fuel consumption, NOx emission characteristic, exhaust temperature characteristic, NOx purifying catalyst characteristic, and other characteristics differ depending upon the engine 1 or vehicle.

If the catalytic converter 11 described above is not functioning, or if the vehicle is not provided with the catalytic converter 11, no fuel is consumed for purifying exhaust gas. Accordingly, the operating point on the optimal fuel consumption line shown in FIG. 6 is not necessarily the one that assures the optimal fuel economy and NOx emission. In this case, the engine 1 is controlled by selecting an operating point that provides a low specific fuel consumption SFC and reduced amounts of pollutants, such as NOx, generated by the engine 1. A control scheme for this situation will be hereinafter described.

Figure 7:
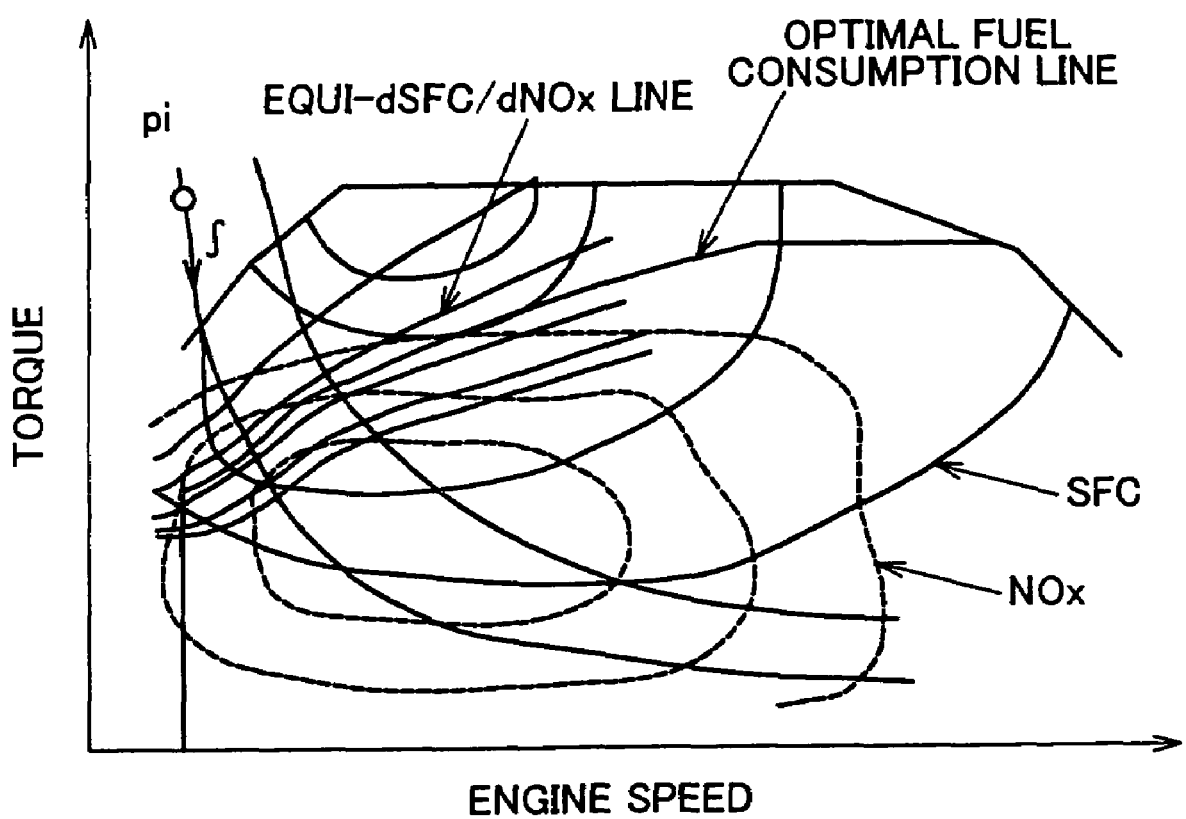
FIG. 7 is a graph showing an example of an optimal fuel consumption line when an exhaust purifying catalyst is not used.

The equi-output lines of the engine 1, the specific fuel consumption SFC, and the NOx emission are shown in the graph of FIG. 7, using the output torque and the engine speed as parameters. On the other hand, the fuel consumption F and the amount of NOx emission N when the vehicle is driven in a certain running mode are determined according to the following equations (3):

$$F = \Sigma ti * pi * si + tidl * sidl$$

$$N = \Sigma ti * pi * ni + tidl * nidl \quad (3)$$

Figure 8:
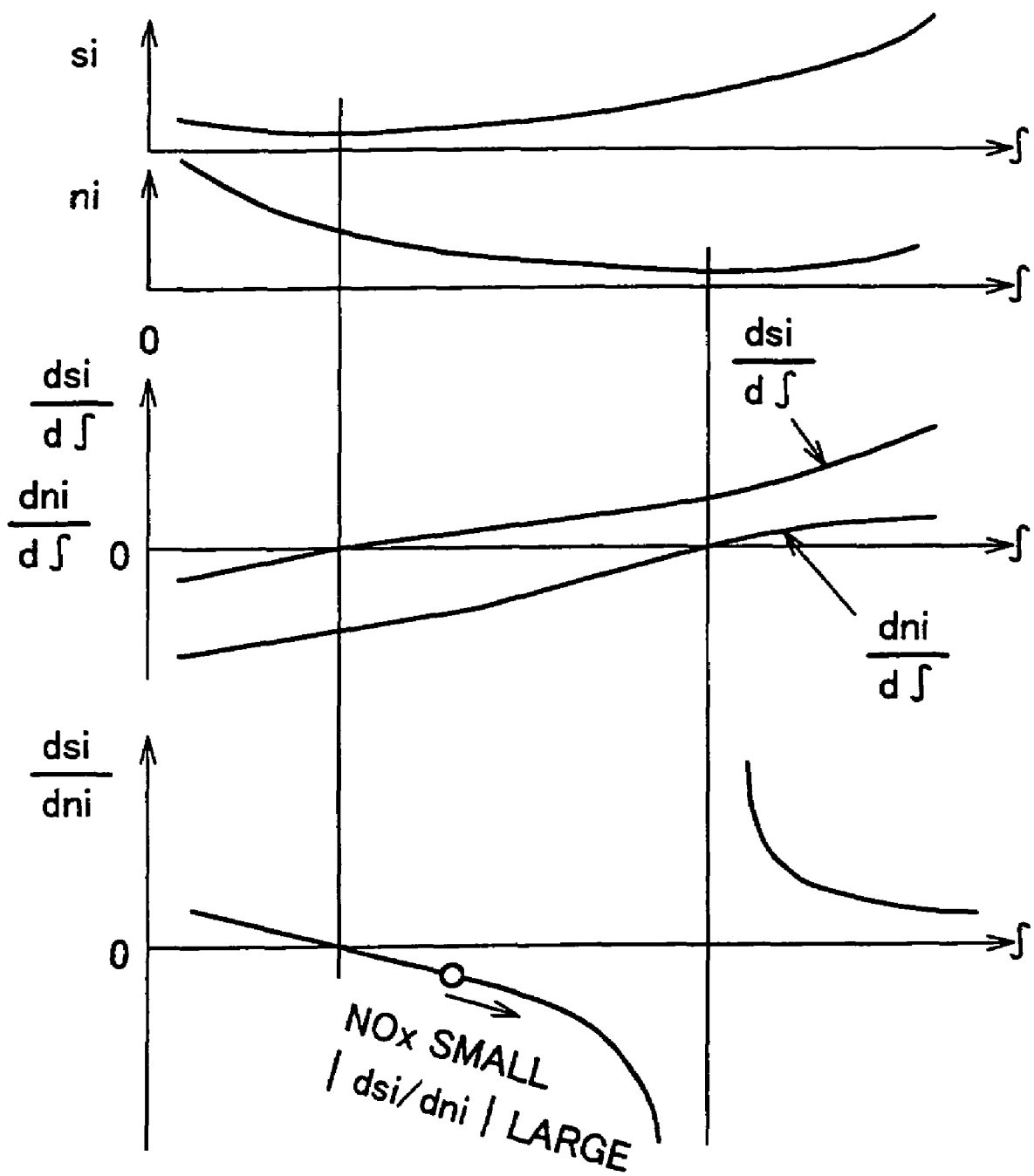
FIG. 8 is a graph showing a specific fuel consumption si, NOx emission ni, dsi/dl, dni/dl, and dsi/dni, which are taken along a certain equi-output line.

In order to determine a combination of (si, ni) which achieves a target NOx emission level and minimizes the fuel consumption F, a relationship between si and ni with respect to a certain output pi is shown in FIG. 8. That is, (dsi/dl) and (dni/dl) are determined along each equi-output line, and the ratio of these factors (dsi/dni) (i.e. the rate of change of SFC/the rate of change of NOx) is obtained.

When the NOx emission in a certain operating state is reduced down to a target level, deterioration of fuel economy is minimized if a point on the equi-output line having the minimum (dsi/dni) is moved Assuming that this attempt is repeated on each equi-output line to achieve the target NOx emission level, a line on which the optimal fuel economy is obtained with respect to a certain target NOx value will be a line connecting points having the same (dsi/dni) on the respective equi-output lines. This line is labeled (equi-dSFC/dNOx line) in FIG. 7.

Figure 9:
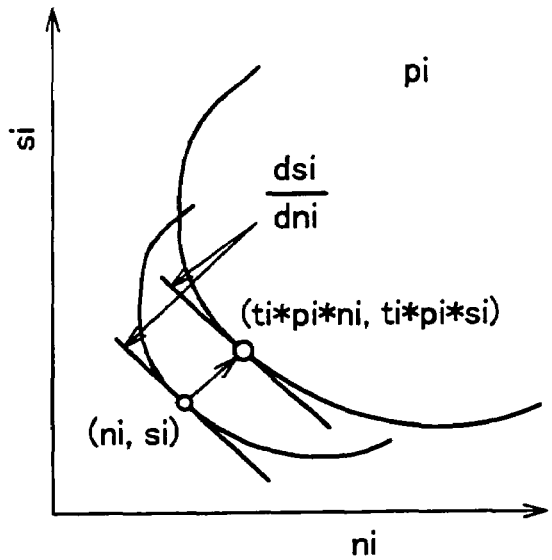
FIG. 9 is a graph showing an example of mapping dsi/dni for a certain output according to a certain running mode.

The same concept applies to the case where the frequency (ti*pi) of each output in a certain vehicle running mode is taken into consideration. In other words, when the frequency (ti*pi) of each output in a vehicle running mode is considered, a point defined by the specific fuel consumption and the NOx emission is shifted by the frequency (ti*pi) in both directions of the fuel consumption axis and the NOx axis, as shown in FIG. 9, so as to provide a similar fuel consumption-NOx relationship. Accordingly, a value of "SFC change rate/NOx change rate" does not change.

As shown in FIG. 7, a plurality of equi-dSFC/dNOx lines can be drawn, and which of these lines is the optimal fuel consumption line depends upon a target NOx value, a running mode, and the type or characteristics of the engine. In actual control of a vehicle, therefore, the optimal fuel consumption line is determined experimentally, and data representing the line is stored as, for example, map values in the electronic control unit 18. The data thus stored may be used in Block B3 shown in FIG. 4 to determine a target engine speed. Also, the lower limit of applicable NOx target values is equal to a NOx emission level on an optimal NOx line (i.e., a line connecting points having the minimum NOx emission on equi-output lines).

In the manner as described above, the control apparatus according to the exemplary embodiment is able to minimize fuel consumption while maintaining the NOx emission generated by the engine 1 at the target value. Therefore, even when the vehicle is not provided with a removal means, such as a catalyst, for removing pollutants, such as NOx, generated by the engine 1, or when such removal means is not effectively functioning, the vehicle is able to satisfy an exhaust regulation value while at the same time exhibiting excellent fuel economy.

As stated above, the optimal fuel consumption line as shown in FIG. 7 can be adopted when the catalytic converter 11 installed in a vehicle is not effectively functioning. Thus, the vehicle having the catalytic converter 11 is provided with both the optimal fuel consumption line of FIG. 7 and that of FIG. 6 or its modified fuel consumption lines (i.e., the solid line A and the solid line B). Depending upon whether the catalytic converter 11 is effectively functioning as exhaust purifying means or not, one of these fuel consumption lines is selected, and the selected line is used, for example, in Block B3 to control the engine speed according to each situation so as to achieve improved fuel economy.

Figure 10:
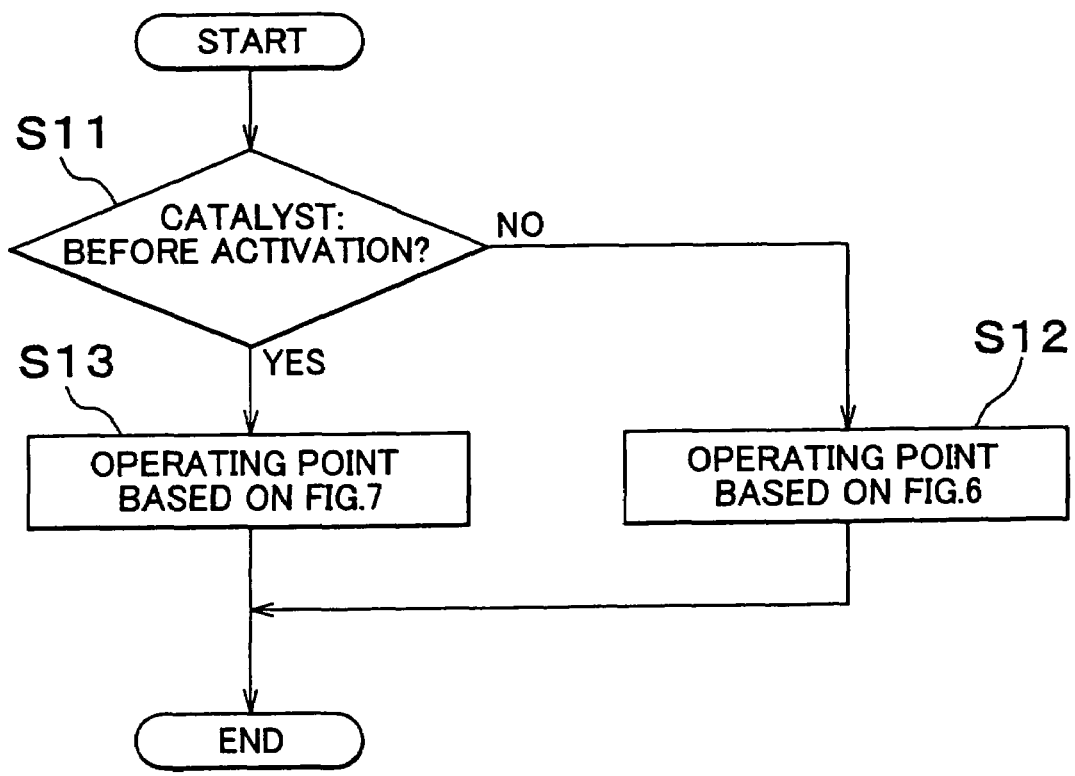
FIG. 10 is a flowchart for explaining a control scheme in which an operating point is shifted before and after an exhaust control catalyst is activated or not.

The above control is illustrated in the flowchart of FIG. 10, for example. Initially, it is determined in step S11 whether the catalyst is in an activated condition or not. This determination can be made based on, for example, the catalyst temperature. A negative decision (NO) is obtained in step S11 if the catalyst temperature is equal to or higher than the activation temperature, and the catalyst has already been in an activated state. In this case, the catalyst is able to purify exhaust gas, and therefore the operating point of the engine 1 is determined based on FIG. 6 in step S12. To the contrary, an affirmative decision (YES) is obtained in step S11 if the catalyst temperature is lower than the activation temperature, and the catalyst is not activated. In this case, the catalyst is not able to purify exhaust gas, and therefore the operating point of the engine 1 is determined based on FIG. 7 in step S113, giving priority to a reduction of NOx generated by the engine 1.

In the above case, the control using the optimal fuel consumption line as shown in FIG. 7 gives priority to reduction of NOx generated by the engine 1, rather than reduction of fuel consumption. On the other hand, the control using the optimal fuel consumption line as shown in FIG. 6 or the solid lines A, B based on the optimal fuel consumption line gives priority to reduction of fuel consumption, rather than reduction of NOx generated by the engine 1.

Also, in a vehicle that is not equipped with exhaust purifying means, such as the catalytic converter 11, the engine 1 is controlled to be operated at an operating point on the optimal fuel consumption line in FIG. 7. More specifically, the control is carried out by determining a target engine speed in Block B3 as mentioned above, using a map based on the optimal fuel consumption line of FIG. 7, and controlling the speed ratio of the CVT 17 to achieve the target engine speed.

In the meantime, the minimum fuel consumption point is on the high-load side whereas the minimum NOx point is in the low-load side, as shown in FIG. 7, and therefore the operating point at which the fuel consumption is minimized with respect to a certain target NOx level, or the optimal fuel consumption line, lies between these minimum points. The optimal fuel consumption line or the engine operating line connecting points at which the fuel consumption is minimized for each output forms a curve that is approximate or similar to an equi-NOx line connecting points having the same NOx emission level, in a low-load low-speed range. Namely, the approximation between these lines appears in a range that is on the low-speed, high-load (high torque) side with respect to the minimum NOx point in the graph using output torque and engine speed as parameters. Thus, at least in a part of this range, a target operating point of the engine 1 may be set to a point on an engine operating line that is set along an equi-NOx line.

Figure 11:
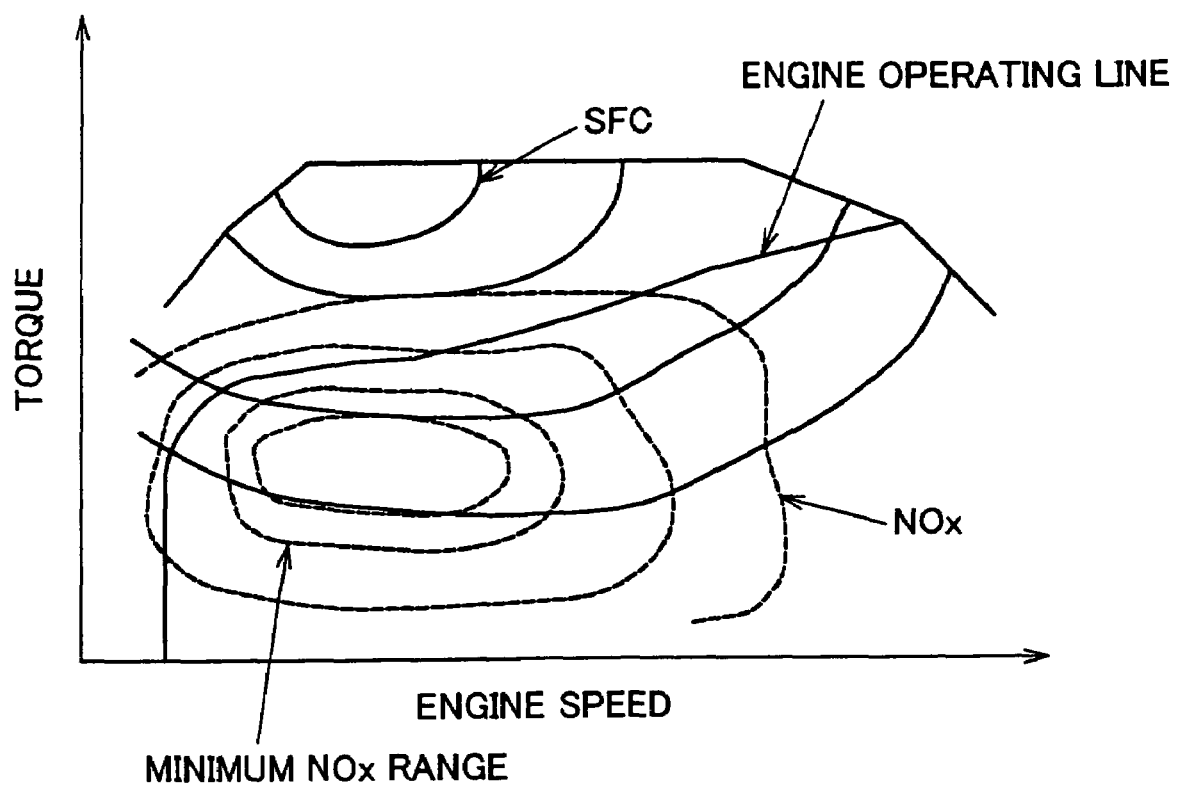
FIG. 11 is a graph showing an example of an engine operating line which approximates an equi-NOx line in a low-output range.

FIG. 11 shows an example of the engine operation line thus obtained. If the target operating point of the engine 1 is set to a point on the engine operating line as shown in FIG. 11, the NOx emission does not increase but the fuel consumption increases to a larger value than that at the operating point on the optimal fuel consumption line as shown in FIG. 7. Nevertheless, such fuel economy deterioration is insignificant, causing almost no problem in practical use.

The engine 1 may be controlled based on the engine operation line as shown in FIG. 11, in the same manner as described above with respect to each control scheme. Specifically, a map of target engine speeds is prepared based on the engine operating line as shown in FIG. 11, and a target engine speed is determined in Block B3 in FIG. 4, referring to the map.

While NOx is illustrated as an example of a pollutant in exhaust gas, the invention is not limited to details of the illustrated embodiment, but may also be applied to control apparatuses for reducing the amounts of pollutants other than NOx. Although not particularly stated in the above embodiment, the equi-NOx lines as shown in FIG. 6, FIG. 7 and FIG. 11 respectively represent characteristic lines obtained when other NOx reduction control, such as EGR, is executed. Furthermore, while the engine as described above is constructed such that the air-fuel ratio is reduced, and resulting fuel is supplied to the catalyst as exhaust purifying means, fuel may be directly added to exhaust gas to be supplied to the catalyst.

Next, a control apparatus for an internal combustion engine and a control method thereof according to another exemplary embodiment of the invention will be explained. As the internal combustion engine controlled by this control apparatus, the direct-injection injection type diesel engine 1 as shown in FIG. 2 may be employed.

The engine 1 is controlled so as to minimize fuel consumption in accordance with a required driving force. One example of such control will be briefly described. Initially, a target driving force is determined based on an accelerator operated amount representing the required driving force and a vehicle speed, and then a target output is determined based on the target driving force and the vehicle speed. On one hand, a target engine speed is determined based on the target output. For example, the target engine speed may be obtained by using the target output, and also using a map in which an engine speed that provides the minimum fuel consumption is predetermined with respect to each output. Then, the speed ratio of the aforementioned CVT 17 is controlled so as to achieve the target engine speed.

On the other hand, a target engine torque is determined based on the target output and the engine speed as described above. Then, the engine load (more specifically, the throttle opening or the fuel injection quantity) is controlled so as to generate the target engine torque.

An operating point determined by the engine speed and the engine load set in the above manner lies on the optimal fuel consumption line on which the fuel consumption is minimized, and the air-fuel ratio (a ratio of the fuel to the air in a mixture burned in the engine 1) is made larger than the stoichiometric air-fuel ratio. Namely, the air-fuel mixture contains excess air. Since the engine 1 is operated at an operating point on the optimal fuel consumption line during normal running of the vehicle, an air-fuel ratio that is leaner (larger) than the stoichiometric air-fuel ratio is established during normal running.

NOx, which is generated as a result of combustion of a fuel in the engine 1, is stored in the aforementioned storage-reduction type catalyst provided in the exhaust system. As the engine 1 continues operating, the amount of NOx stored in the catalyst increases. Therefore, by supplying a reducing agent or reductant at predetermined time intervals to create a reducing atmosphere, namely, by executing rich spikes, nitrate-form nitrogen stored in the catalyst is reduced into nitrogen gas, and is released into the atmosphere. The rich spikes are executed, for example, when the fuel injection time that has been accumulated reaches a preset reference value. In this case, the control apparatus according to this embodiment controls the excess air ratio (or air-fuel ratio) of the mixture at the time of supply of the reducing agent, to be different from that during normal running of the vehicle. An example of a control scheme for performing this control will be explained.

Figure 12:
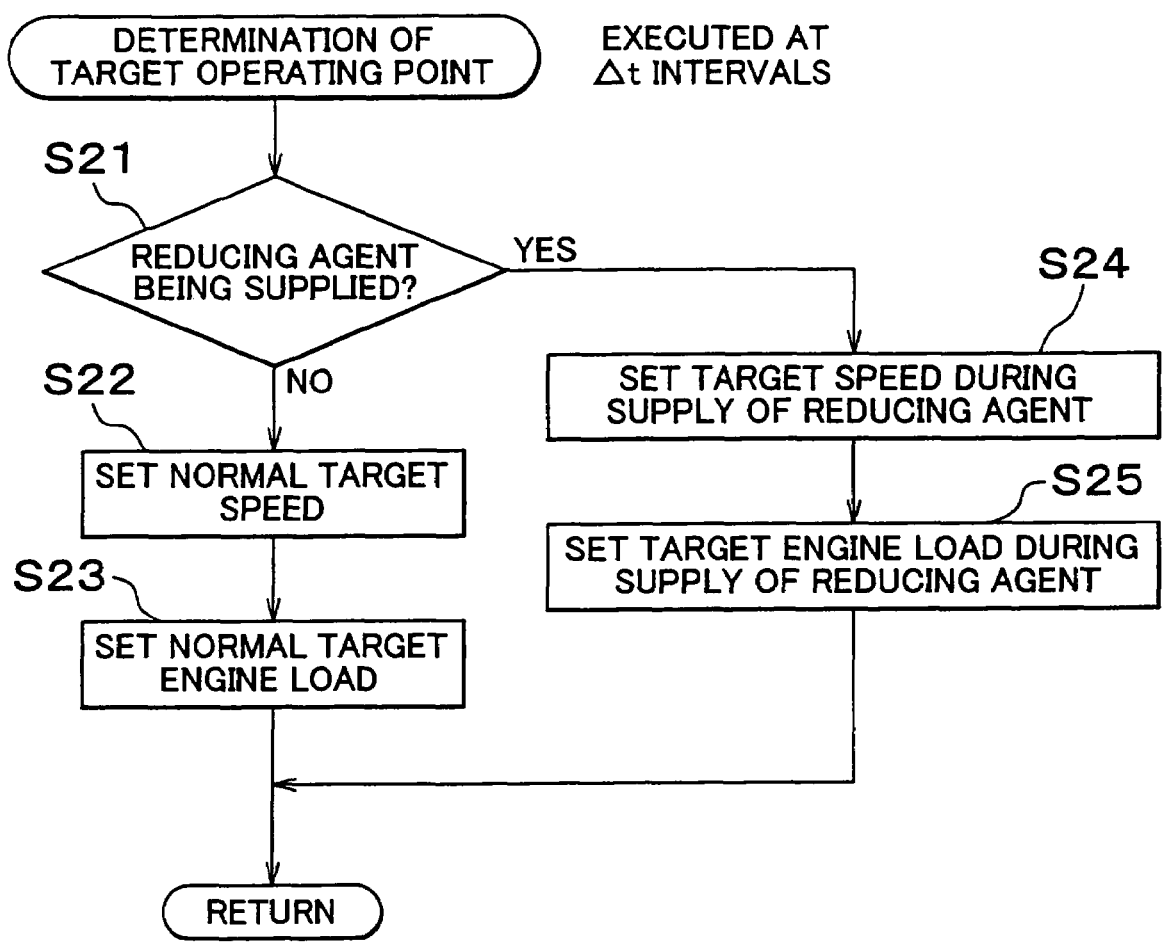
FIG. 12 is a flowchart showing a control scheme by a control apparatus according to an exemplary embodiment of the invention.

FIG. 12 is a flowchart showing a control routine that realizes the above control scheme. The control routine of FIG. 12 is executed at predetermined intervals of a short time Δt. Initially, in step S21, it is determined whether a process of supplying the reducing agent is being carried out or not. This determination is made so as to determine whether the amount of NOx stored in the catalyst has reached a predetermined value, and control for supplying a reducing agent for reducing and releasing a nitrogen component of NOx has been started. This determination may be made on the basis of an accumulated or total value of the fuel injection time, or a signal generated when the total value reaches a reference value.

If a negative decision (NO) is obtained in step S21, namely, if the reducing agent is not being supplied, a target engine speed for normal running is set in step S22, and a target engine load for normal running is set in step S23. The control of steps S22 and S23 is performed for operating the engine 1 at an operating point on the optimal fuel consumption line as described above. In these steps, the electronic control units 18, 19 calculate the target engine speed and the target engine load, based on an accelerator operated amount representing the required driving force, the current vehicle speed, a map or maps, the current engine speed, and the like.

To the contrary, if a positive decision (YES) is obtained in step S21, namely, if it is determined that the process of supplying the reducing agent is being executed, a target engine speed during reductant supply is set in step S24. At the same time, a target engine load during reductant supply is set in step S25. The control of steps S24 and S25 is performed for reducing the excess air ratio of the mixture without changing the engine output at the time when the positive decision was made in step S21. More specifically, the target engine speed and the target engine load are set such that the operating point of the engine 1 coincides with an intersection of an equi-output line corresponding to the current engine output and an equi-excess-air-ratio line that is smaller than that of the excess air ratio for normal running (i.e., an excess-air-ratio line corresponding to the air-fuel ratio that is equal to or smaller than the stoichiometric air-fuel ratio).

Figure 13:
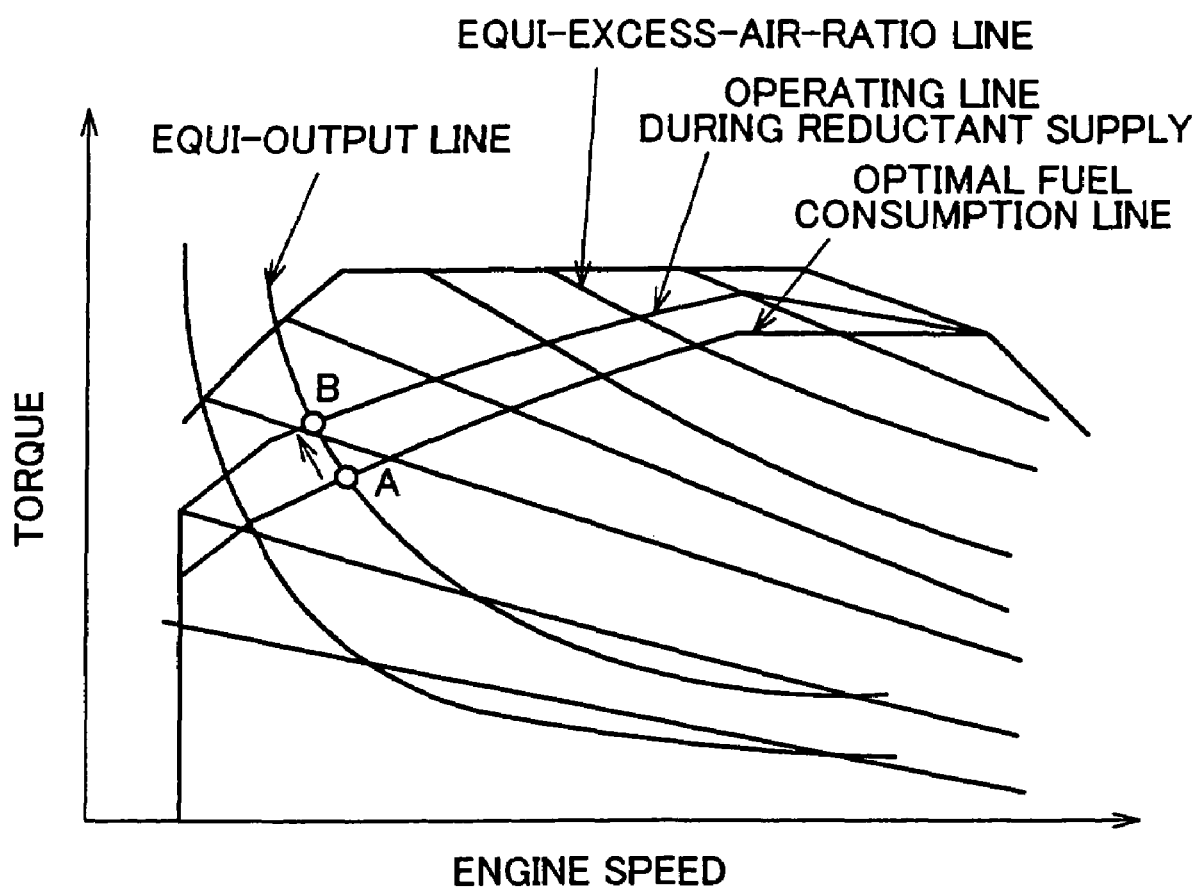
FIG. 13 is a graph showing shifting of an operating point of an internal combustion engine when an excess air ratio is reduced.

The control scheme as described above is illustrated in FIG. 13. In FIG. 13, the engine 1 is operated at an operating point A on the optimal fuel consumption line during normal running of the vehicle until step S21 determines that the reducing agent is being supplied. In this condition, if it is determined that the reducing agent is being supplied, the operating point of the engine 1 is set to an operating point B that has a smaller excess air ratio and lies on the equi-output line on which the point A exists. Thus, the engine speed and the engine torque corresponding to the operating point B are established. In this case, the engine speed is controlled by controlling the speed ratio of the aforementioned CVT 17. Also, the engine torque is controlled by controlling the throttle angle or fuel injection quantity.

Such control is executed for each normal operating condition on the optimal fuel consumption line, and an operation line (a line connecting the operating points) during reductant supply is obtained by drawing a line substantially parallel to the optimal fuel consumption line, on the higher-load side, as shown in FIG. 13. Here, the point B or the operation line during reductant supply is preset based on experiments, or the like.

With the control of steps S24 and S25 executed, namely, in a condition where the excess air ratio of the mixture is reduced to make the air-fuel ratio closer to the stoichiometric air-fuel ratio, the reducing agent is supplied. One example of such reductant supply is a rich spike as explained above, upon which the amount of fuel supplied (injection quantity) is temporarily increased such that the air-fuel ratio becomes smaller than the stoichiometric air-fuel ratio. As a result, unburned fuel remains in exhaust gases discharged from the cylinders of the engine 1, and is carried over to the catalyst to create a reducing atmosphere to which the catalyst is exposed. Therefore, nitrate-form nitrogen stored in the catalyst is reduced to nitrogen gas and is released, while at the same time the amount of nitrogen stored in the catalyst is reduced.

Since the excess air ratio in the engine 1 is reduced in the process of reduction of NOx upon rich spikes, the amount of fuel that is supplied as the reducing agent and is burned before it reaches the catalyst is reduced. Thus, the fuel supplied as the reducing agent is less likely to increase the engine load, and an increase in the engine load and the resulting fuel consumption are prevented or suppressed, thereby avoiding or mitigating deterioration of the fuel economy. Also, since the engine load is not increased, engine torque or driving torque increases to prevent or suppress behavioral changes, such as impacts and vibrations.

Furthermore, by reducing the excess air ratio of the air-fuel mixture, the amount of air that absorbs heat generated by combustion is reduced, and a relative increase in the amount of fuel results in an increase in the amount of heat generated and an accordingly raised catalyst temperature. Consequently, the activation of the catalyst is promoted, resulting in an improved exhaust purifying capability, which makes it easier to comply with exhaust or emission control regulations.

In the above-described control scheme, the excess air ratio is reduced in steps S24 and S25, by reducing the speed ratio so as to reduce the engine speed, while at the same time increasing the engine load in accordance with the reduction in the engine speed. The excess air ratio, however, may be reduced by another means. An example of such means is shown in FIG. 14.

Figure 14:
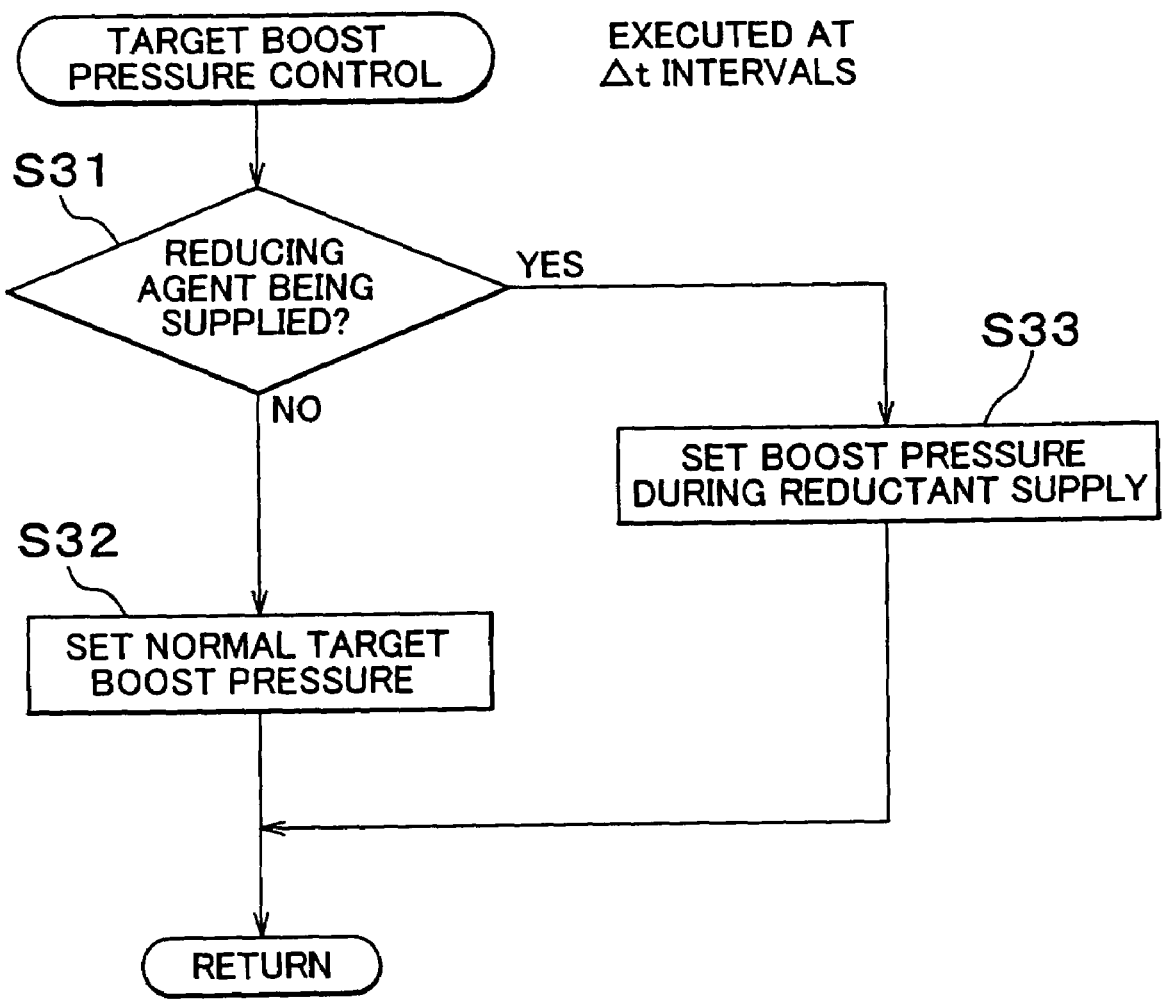
FIG. 14 is a flowchart showing a control scheme by a control apparatus according to another exemplary embodiment of the invention.

The example of FIG. 14 applies to the case where supercharging is conducted during normal running of the vehicle. A flowchart as shown in FIG. 14 is executed at predetermined intervals of a short time Δt. In the control routine as shown in FIG. 14, step S31 is initially executed to determine whether a process of supplying a reducing agent is being carried out or not. This control is the same as that in step S21 in FIG. 12. If a negative decision (NO) is obtained in step S31, namely, if the vehicle is in a normal operating state, a target boost pressure for normal running is set in step S32. For example, the boost pressure is set to provide an air-fuel ratio that corresponds to an operating point on the optimal fuel consumption line as mentioned above.

To the contrary, if a positive decision (YES) is obtained in step S31, the boost pressure is set to a predetermined level adapted for reductant supply in step S33. This pressure may be at a level that achieves the air-fuel ratio corresponding to the operating point B as shown in FIG. 13, for example, and is lower than the boost pressure established when the determination in step S31 is made. The boost pressure level for use upon reductant supply may be determined in advance. Furthermore, the boost pressure may be controlled by adjusting a nozzle opening in a variable nozzle turbo, if used, or by opening or closing a waste gate valve or adjusting an opening amount of this valve.

With the excess air ratio thus reduced by reducing the boost pressure, the fuel supplied as a reducing agent is less likely to be burned with the air in the exhaust gas and consumed, as in the control example of FIG. 2. As a result, unnecessary fuel consumption is prevented or suppressed to improve the fuel economy. Also, when the catalyst temperature is low, the temperature is increased to improve the exhaust purification performance.

In the illustrated examples, the excess air ratio is reduced by reducing the engine speed and increasing the engine load, or by reducing the boost pressure. According to another embodiment of the invention, however, the air excess ratio may be reduced by, for example, adjusting an open/close timing of intake and exhaust valves of the engine and thus reducing the amount of air drawn into cylinders. Also, the reducing agent for creating a reducing atmosphere for the exhaust purifying catalyst may be a fuel supplied into the cylinders for producing an air-fuel mixture, or a fuel that is injected into the cylinders while an exhaust valve is open and is mixed into exhaust gas, or an appropriate reducing agent supplied directly into any part of the exhaust system. Furthermore, the engine to be controlled by the control apparatus of the invention is not necessarily equipped with an exhaust-driven turbocharger, but may be equipped with a supercharger driven by the engine or motor. The catalyst for use in the invention may be a catalyst other than the aforementioned storage-reduction catalyst, and a substance to be purified is not limited to NOx.

Next, a control apparatus for an internal combustion engine and a control method thereof according to a further embodiment of the invention will be explained. Also, as the internal combustion engine controlled by this control apparatus, a direct-injection type diesel engine 1 as shown in FIG. 2 can be adopted.

The engine 1 is basically controlled so as to minimize fuel consumption in accordance with a required driving force. One example of such control will be briefly described. Initially, a target driving force is determined based on an accelerator operated amount representing the required driving force and a vehicle speed, and then a target output is determined based on the target driving force and the vehicle speed. On one hand, a target engine speed is determined based on the target output. For example, the target engine speed may be obtained by using the target output, and also using a map in which an engine speed that provides the minimum fuel consumption is predetermined with respect to each output. Then, the speed ratio of the CVT 17 is controlled so as to achieve the target engine speed.

On the other hand, a target engine torque is determined based on the target output and the engine speed as described above. Then, the engine load (more specifically, the throttle opening or the fuel injection quantity) is controlled so as to generate the target engine torque.

An operating point determined by the engine speed and the engine load set in the above manner lies on the optimal fuel consumption line on which the fuel consumption is minimized, and the air-fuel ratio (a ratio of the fuel to the air in a mixture burned in the engine 1) is made larger than the stoichiometric air-fuel ratio. Namely, the air-fuel mixture contains excess air. Since the engine 1 is operated at an operating point on the optimal fuel consumption line during normal running of the vehicle, an air-fuel ratio that is leaner (larger) than the stoichiometric air-fuel ratio is established during normal running. In a transient state in which the operating state of the vehicle is rapidly changed, for example, upon a start or a rapid acceleration of the vehicle, the engine 1 is operated at an operating point that deviates from the optimum consumption line. In this case, soot, which is generated depending upon operating conditions of the engine 1, may be trapped by the catalytic converter 11 as described above, or a part of the soot may flow into an exhaust gas recirculation system.

NOx, which is generated as a result of combustion of a fuel in the engine 1, is stored in the aforementioned storage-reduction type catalyst provided in the exhaust system. As the engine 1 continues operating, the amount of NOx stored in the catalyst increases. Therefore, by supplying a reducing agent or reductant at predetermined time intervals to create a reducing atmosphere, namely, by executing rich spikes, nitrate-form nitrogen stored in the catalyst is reduced into nitrogen gas, and is released into the atmosphere. The rich spikes are executed, for example, when the fuel injection time that has been accumulated reaches a preset reference value. More specifically, the amount of NOx generated in the engine 1 has a correlation with an engine operating state, such as an engine load or an engine speed, and the amount of NOx stored in the catalyst has a correlation with a concentration of NOx in the exhaust gas from the engine 1 or a period of time for which the NOx concentration is maintained. Therefore, the amount of NOx can be accumulated or integrated by accumulating the fuel injection quantity or fuel injection time. Thus, the timing of execution of rich spikes can be determined by accumulating the fuel injection time for each operating state of the engine 1.

In the meantime, the amount of particulate matters (PM), such as soot, decreases on the high-load side on which the air-fuel ratio is reduced. In other words, if the operating state of the engine 1 is changed so as to reduce an amount of one emission of the particulate matters and NOx, the other emission (NOx or PM) will increase. Also, the amount of both of these emissions (PM and NOx) are correlated with each other to some extent. Accordingly, the amount of the particulate matters, as well as the amount of NOx, can be determined based on the quantity or duration of fuel injection, the amount of PM can be determined.

The control apparatus according to this embodiment is constructed such that the operating state of the engine 1 is changed depending upon exhaust conditions, in order to suppress emission of pollutants, such as NOx and PM, in the exhaust gas, to comply with relevant emission regulations, and also to prevent or suppress fuel economy deterioration. One example of a control scheme according to this embodiment will be explained with reference to FIG. 15.

Figure 15:
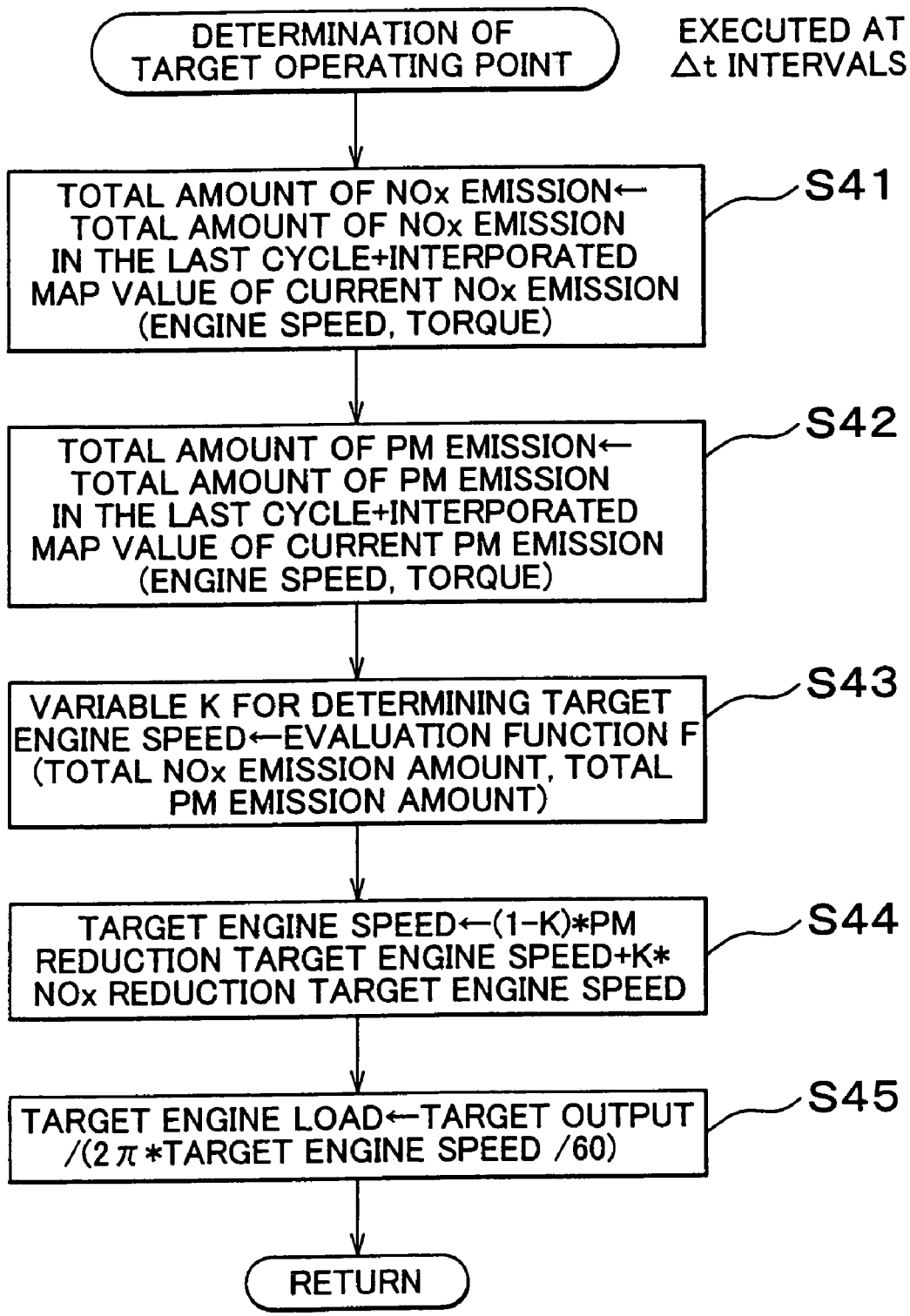
FIG. 15 is a flowchart showing a control scheme by a control apparatus according to a further exemplary embodiment of the invention.

FIG. 15 is a flowchart showing a control routine to be executed at predetermined intervals of short time Δt. In FIG. 15, step S41 is initially executed to determine an accumulated or total amount of emission of NOx, so as to obtain a target operating state, or a target operating point, of the engine 1. The total amount can be calculated by, for example, determining the current amount of NOx emission from a map having the engine speed and the engine load (or engine torque) as parameters, or obtaining an interpolated value from the map, and then adding the obtained current value to the previously accumulated value of NOx emission.

In a similar manner, the accumulated or total value of PM emission is determined in step S42. Namely, the total value can be calculated by determining the current amount of PM emission from a map having the engine speed and the engine load (or engine torque) as parameters, or obtaining an interpolated value from the map, and then adding the obtained current value to the previously accumulated value of PM emission.

The total amount of emission of NOx or PM can be calculated as described above, because of the fact that the amount of emission of each of NOx and PM is correlated with the operating state of the engine 1. It follows that the above-described step S41 or step S42 is supposed to determine the emission history of NOx or PM, respectively. Furthermore, since the amount of NOx has a contradictory relationship with that of PM and both emissions have some correlation with each other as mentioned above, the amount of one emission or the total value thereof can be determined based on the amount of the other emission or the total value thereof.

Next, in step S43, a variable K for determining a target engine speed is obtained based on the total value of each of the emissions (NOx and PM) as indicated above. The variable K is calculated, for example, based on an evaluation function F that is prepared in advance using the total values of NOx and PM as parameters. The evaluation function F is, for example expressed as follows:

$$K = (\text{total value of NOx/total value of PM}) \times \text{constant}$$

According to the evaluation function F, the variable K increases when the NOx emission becomes greater than the PM emission as the engine 1 is kept running, whereas the variable K decreases when the PM emission becomes greater than the NOx emission during continuous running of the engine 1.

Based on the variable K thus obtained, a target engine speed is determined in step S44. For example, a target engine speed for PM reduction, with which the amount of PM is reduced, is preset on the higher-load side with respect to the optimal fuel consumption operating point at which the fuel consumption is minimized, or the current operating point, while at the same time a target engine speed for NOx reduction, with which the amount of NOx is reduced, is preset on the lower-load side with respect to the optimal fuel consumption operating point at which the fuel consumption is minimized, or the current operating point. Then, a target engine speed is determined by adding an engine speed obtained by multiplying the PM reduction target engine speed by (1−K) to an engine speed obtained by multiplying the NOx reduction target engine speed by the variable K.

Figure 16:
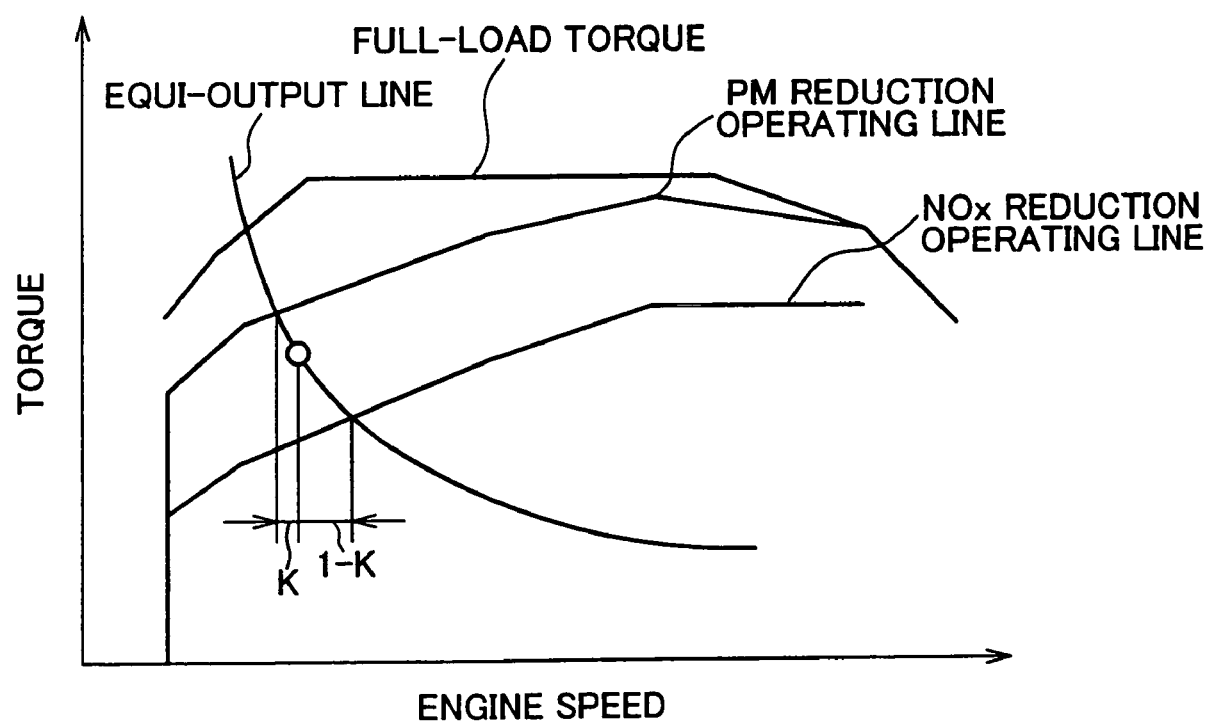
FIG. 16 is a graph showing an operating state, using engine speed and engine torque (engine load) as parameters.

Referring to FIG. 16, a PM reduction operating line and a NOx reduction operating line are plotted using the engine speed and the engine torque (engine load) as parameters. Each of these lines is drawn by connecting operating points that are spaced by a predetermined amount on the higher-load side or lower-load side, with respect to the optimal fuel consumption line on which the fuel consumption is minimized. Once the variable K is obtained in a condition where the engine 1 is operated with a certain output, a sum of the engine speed obtained by multiplying the PM reduction engine speed at the same output by (1−K) and the engine speed obtained by multiplying the NOx reduction engine speed at the same output by the variable K can be obtained. Here, the PM reduction engine speed is defined by an intersection of an equi-output line corresponding to the current output and the PM reduction operating line, and the NOx reduction engine speed is defined by an intersection of an equi-output line corresponding to the current output and the NOx reduction operating line. If the variable K is greater than 0.5, the engine speed is closer to the NOx reduction operating line than to the PM reduction operating line. If the variable K is smaller than 0.5, the engine speed is closer to the PM reduction operating line than to the NOx reduction operating line. The engine speed thus determined is indicated by a circle on the equi-output line in FIG. 16.

As stated above, a target driving force is determined based on the accelerator operated amount, and the like, and a target output is determined based on the target driving force, the vehicle speed, and the like. Therefore, a target engine load is determined based on the target output and the target engine speed in step S45 in FIG. 15. This calculation can be performed, for example, based on the expression as shown in step S45 in FIG. 15. The target engine load and the aforementioned target engine speed are obtained based on NOx and PM emission history or the total values of such emissions, and are not influenced by changes in the required driving force, running conditions, and the like. Accordingly, the operating state determined by the target engine speed and the target engine load is changed on the equi-output line to maintain the output established just before the control of FIG. 15. The target engine speed is achieved by controlling the speed ratio of the CVT 17, and the target engine load is achieved by controlling the fuel injection quantity.

In the above-described control scheme of FIG. 15, therefore, the operating state or point is controlled to be closer to an operating point on the NOx reduction operating line as the variable K increases with an increase in the total amount of NOx emission. On the other hand, the operating state or point is controlled to be closer to an operating point on the PM reduction operating line as the variable K decreases with an increase in the total amount of PM emission. After all, the operating state of the engine 1 is changed in the direction of reducing the amount of a pollutant whose total amount of emission is larger. Also, as mentioned earlier, since there is some correlation between the amount of NOx emission and that of PM emission, and the condition of emission of one of NOx and PM can be known based on the emission history or total value of the other emission, the operating state of the engine 1 may be changed based on the amount of either emission or the total value thereof.

In the apparatus that performs the above-described control as shown in FIG. 15, when the total amount of emission of one of the pollutants, i.e., NOx and PM having contradictory emitting characteristics, is increased, the operating state of the engine 1 is changed so as to reduce the amount of emission of the above-indicated one pollutant whose amount has been increased. This arrangement can avoid a situation of excessive releasing or discharge of NOx or PM, thus making it easier to comply with exhaust or emission regulations as well as improving the fuel economy.

As described above, the storage capacity of the NOx storage-reduction catalyst is restored or recovered by performing rich spikes, so that the total amount of emission of NOx is reset upon execution of a rich spike. Also, when PM is burned after being trapped by a filter, the total amount of PM emission is reset upon PM burning.

Meanwhile, the exhaust gas generated by burning fuel in the engine 1 is released to the atmosphere after being processed by a so-called emission control device, such as the above-described catalytic converter 11. Thus, the exhaust purifying capability of the emission control device has an influence on the amounts of NOx and PM released to the atmosphere. Accordingly, the operating state of the engine 1 can be controlled with higher accuracy by taking account of the exhaust purifying capability of the emission control device.

Figure 17:
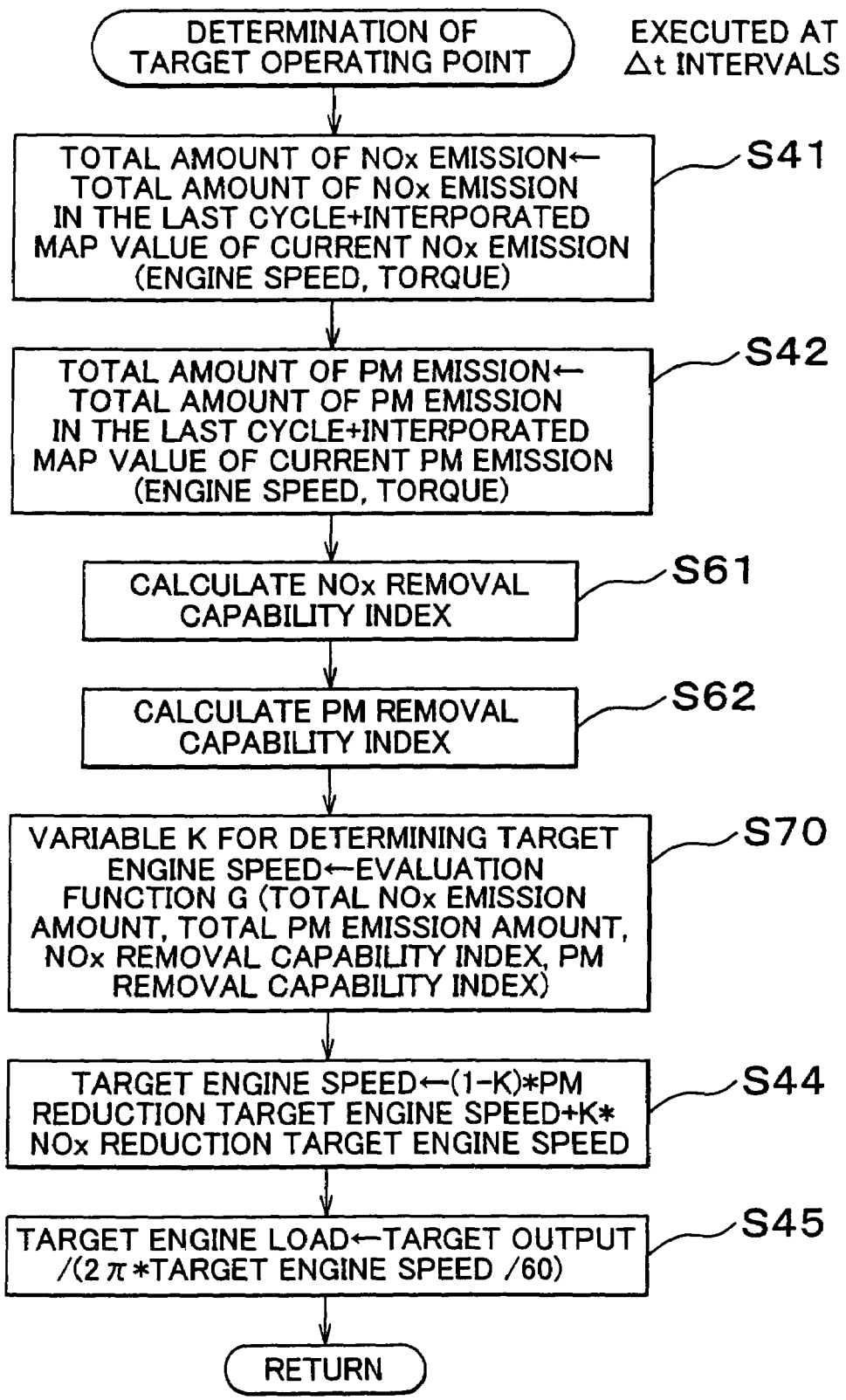
FIG. 17 is a flowchart showing a control scheme by a control apparatus according to another exemplary embodiment of the invention.

FIG. 17 is a flowchart showing a control routine for realizing the control scheme as described above, in which the variable K for determining a target engine speed as used in the control routine of FIG. 15 is determined by taking account of the NOx and PM removal capabilities of the emission control device. In step S61 following step S42 in the control routine of FIG. 17, a NOx removal capability index is calculated, and, in the following step S62, a PM removal capability index is calculated.

In the case where the aforementioned NOx storage-reduction type catalyst is used as the emission control device, the NOx removal capability decreases gradually as the amount of NOx stored in the catalyst increases. Thus, the NOx removal capability can be calculated or estimated based on the operating time of the engine 1 or the running distance of the vehicle after a rich spike is executed. Alternatively, the amount (or concentration) of NOx at the discharge side (the outlet) of the emission control device may be detected by an appropriate sensor, and the NOx removal capability may be calculated or estimated based on the detected amount (or concentration) of NOx.

In the case where a catalyst is used which performs an oxidizing process for removing particulate matters, as well as a process of storing and reducing NOx, the PM removal capability can be calculated or estimated in the same way as that of calculating or estimating the NOx removal capability. Also, when a filter for trapping particulate matters is used, the PM removal capability can be calculated or estimated based on the operating time of the engine 1 or the running distance of the vehicle after the filter is regenerated or recovered.

In step S70 following step S62, a variable K for determining a target engine speed is calculated based on an evaluation function G using each removal capability index obtained by numerically processing each removal capability thus obtained and the total amount of each emission of NOx and PM as parameters. For example, the evaluation function G is expressed as follows:

$$K=\{(\text{total amount of NO}x \text{ emission} \times \text{NO}x \text{ removal capability index})/(\text{total amount of PM emission} \times \text{PM removal capability index})\} \times \text{constant}$$

Each removal capability index as used in the evaluation function G has a value that decreases as corresponding removal capability increases.

In step S44 following step S70, a target engine speed is determined based on the variable K thus obtained, and in the following step S45, a target engine load is determined based on the target engine speed and the target output. Then, these target values can be achieved by controlling the speed ratio of the CVT 17 or the fuel injection quantity, just like in the control examples as explained above.

Consequently, in the control routine as shown in FIG. 17, the value of the variable K for determining the target engine speed is increased as the total amount of NOx emission increases or the NOx removal capability of the emission control device decreases because of a large amount of NOx emission. As a result, the operating state or point of the engine 1 is set close to the NOx reduction operating line on the equi-output line as shown in FIG. 16. To the contrary, the value of the variable K for determining the target engine speed is decreased as the total amount of PM emission increases or the PM removal capability of the emission control device decreases because of a large amount of PM emission. As a result, the operating state or point of the engine 1 is set close to the PM reduction operating line on the equi-output line as shown in FIG. 16.

In other words, according to the control scheme of FIG. 17, the operating state of the engine 1 is changed so as to increase the amount of one emission for which the emission control device exhibits extra removal capability, relative to the amount of the other emission. Therefore, excessive release of either NOx or PM is prevented, making it easier to comply with exhaust or emission regulations. Also, as the operating state of the engine 1 is changed from a point on the optimal fuel consumption line, deterioration of fuel economy can be prevented or suppressed.

It is to be noted that each removal capability index as mentioned above is reset by execution of a rich spike, burning of PM, or a recovery process, such as reversed flow of exhaust gas through the filter. Also, each removal capability index may be determined by the temperature of the emission control device, or an estimated value or measurement value representing a degree of poisoning of the catalyst, other than the accumulated (stored) amount of the emission as stated above.

It is widely known that unburned hydrocarbon (HC) and particulate matters (PM), such as soot, are contained in exhaust gases from internal combustion engines, in particular, diesel engines, which burn fuel mainly composed of hydrocarbon. As the particulate matters of this type contaminate the atmosphere, the amount of emission thereof needs to be restricted or limited to be equal to or lower than a regulation value. In general, PM is trapped or caught by the aforementioned catalyst and filter and is then oxidized or otherwise processed. With an elapse of time, therefore, the amount of PM accumulated in the emission control device, such as a catalyst or a filter, is increased, which may cause clogging of an exhaust channel. In such a case, the exhaust purifying performance may deteriorate, and, in particular, the NOx removal performance of the aforementioned NOx storage-reduction catalyst may deteriorate as the amount of PM accumulated increases. Thus, a control apparatus according to another embodiment of the invention is adapted to change the operating state of the engine 1 in view of the clogged state of the emission control device including the NOx storage-reduction catalyst and the filter.

Figure 18:
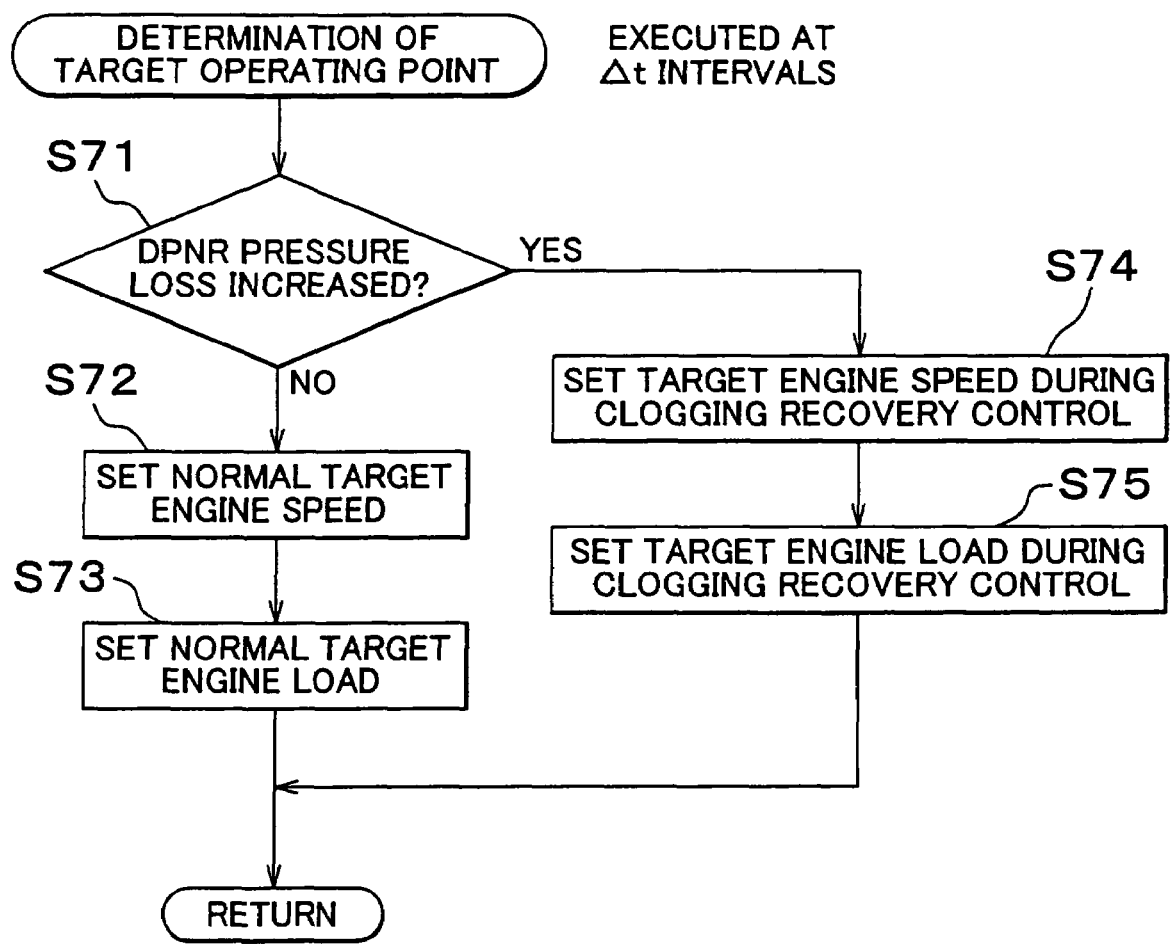
FIG. 18 is a flowchart showing a control scheme by a control apparatus according to another exemplary embodiment of the invention.

FIG. 18 is a flowchart showing a control routine for realizing the control scheme as described above. The control routine of FIG. 18 is executed at predetermined intervals of short time Δt so as to set a target operating point of the engine 1. The engine 1 on which the control of FIG. 18 is performed is a diesel engine equipped with a catalytic converter (DPNR) that traps and oxidizes PM discharged from the diesel engine, and stores and reduces NOx. Initially, it is determined in step S71 whether the pressure loss of the DPNR has increased or not. When the DPNR is in a clogged state, a pressure on its upstream side (inlet side) increases. This fact makes it possible to make a decision in step S71 based on a detection value of the pressure sensor 13 provided in the catalytic converter 11. Also, when the DPNR is in a clogged state, the amount of recirculated exhaust gas increases, resulting in an increase in the air-fuel ratio. Thus, the clogged state of the DPNR can be judged based on a detection value of the aforementioned air-fuel ratio sensor 12.

If a negative decision (NO) is obtained in step S71, it means that there is no particular factor for changing the operating state of the engine 1 based on the condition of the emission control device. Accordingly, a normal target engine speed is set in step S72 and a normal target engine load is set in step S73. These target engine speed and target engine load are set to those values established when the engine 1 is operated along the optimal fuel consumption line as mentioned above.

To the contrary, if a positive decision (YES) is obtained in step S71, a target engine speed for mitigating or recovering the clogged state, or a target engine speed during clogging recovery control, is set in step S74. In addition to changing the target engine speed while maintaining a certain output, a target engine load during clogging recovery control is set in step S75. In other words, an operating state suitable for mitigating or eliminating the clogged state of the emission control device is set.

More specifically, the clogged state as described above is caused by PM accumulation, and therefore the operating state for reducing the amount of PM emission is set. For instance, the operating point is shifted to the higher-load, lower-speed side on the equi-output line. Alternatively, the operating state is changed so that the exhaust temperature is increased so as to promote burning (oxidization) of PM. The engine speed set in this control may be obtained by adding or subtracting a certain speed to or from the engine speed detected when the clogged state is judged. Alternatively, the engine speed may be obtained by adding or subtracting a speed that depends on the clogged state, to or from the engine speed at an operating point on the optimal fuel consumption line that is determined based on the current required output and vehicle speed.

According to the control apparatus which executes control shown in FIG. 18, the clogged state of the emission control device is determined, and the operating state of the engine 1 is changed so as to mitigate or eliminate the clogged state, so that clogging of the emission control device or reduction of the NOx (PM) removal capability can be avoided or prevented. As a result, exhaust gas of the vehicle having the engine 1 can be kept clean and below a regulation value. Also, the clogged state of the exhaust system is promptly eliminated, permitting an engine operation with good fuel economy.

Moreover, when a device that reverses an exhaust inflow direction is used as the emission control device, the control as shown in FIG. 18 may be performed along with the reversal of the exhaust inflow direction.

Clogging of a channel through which the exhaust gas passes may also occur in the exhaust gas recirculation system, as well as the catalytic converter 11 as described above. The exhaust gas recirculation system is provided with an EGR cooler 15 for reducing the exhaust temperature. The EGR cooler 15 has a multiplicity of channels each having a small cross-sectional area, in order to provide a large exhaust heat dissipation area. With this arrangement, PM is likely to adhere to and is accumulated on the inner wall of each channel with a small cross section.

If the exhaust gas recirculation system is clogged as described above, the exhaust gas is not recirculated appropriately and the amount of NOx emission is increased. If the air-fuel ratio is reduced so as to suppress the increase of the NOx emission amount, an unfavorable situation, such as deterioration of the fuel economy, may take place. In view of this, a control apparatus according to a further embodiment of the invention performs control as described below when it is determined that the EGR cooler 15 is in a clogged state.

Figure 19:
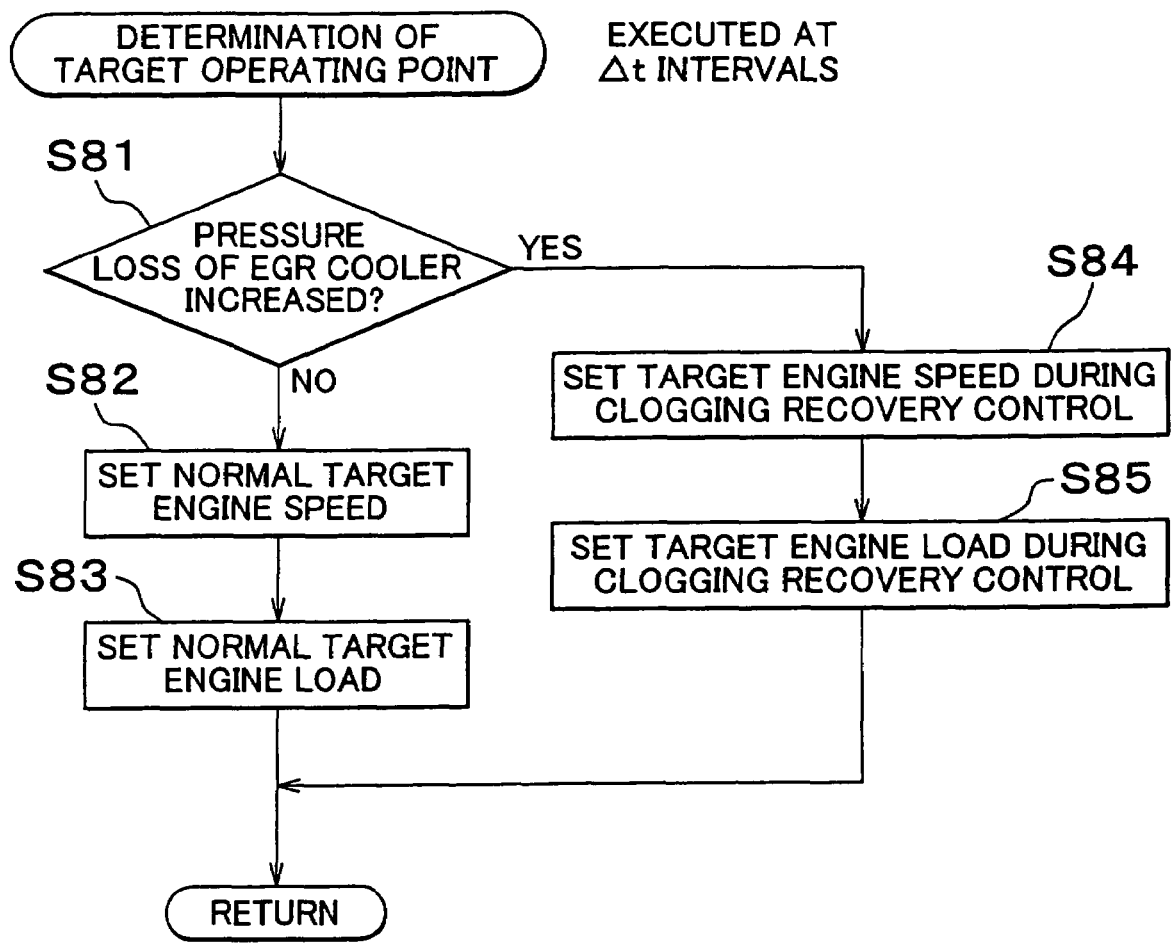
FIG. 19 is a flowchart showing a control scheme by a control apparatus according to another exemplary embodiment of the invention.

FIG. 19 is a flowchart showing a control routine for realizing the control scheme as described above. The control routine of FIG. 19 is executed at predetermined intervals of a short time Δt so as to set a target operating point of the engine 1. In FIG. 19, step S81 is executed to determine whether the pressure loss of the EGR cooler 15 is increased. Although the pressure loss of the EGR cooler 15 is most reliably determined based on a difference between pressures on the inlet side and outlet side of the EGR cooler 15, the pressure loss may also be determined based on a detected pressure of the pressure sensor 13 as mentioned above or a detected value (A/F ratio) of the air-fuel ratio sensor 12.

If a negative decision (NO) is obtained in step S81, a normal target engine speed is set in step S82, and a normal target engine load is set in step S83 based on the target engine speed. The control in steps S82 and S83 is substantially the same as that in steps S72 and S73 as shown in FIG. 18.

To the contrary, if a positive decision (YES) is obtained in step S81, a target engine speed for mitigating or recovering the clogged state of the EGR cooler 15, namely, a target engine speed during clogging recovery control, is set in step S84. Furthermore, in step S85, a target engine load, namely, a target engine load during clogging recovery control, is set in addition to changing the target engine speed while maintaining a certain output. In other words, an operating state suitable for mitigating or eliminating the clogged state of the EGR cooler 15 is set.

The control of steps S84 and S85 is similar to that of steps S74 and S75 in FIG. 18, except for a small difference in terms of control due to a difference in the place where clogging occurs. Namely, the controls slightly differ depending upon whether clogging occurs in the emission control device or in the EGR cooler 15. Since the clogged state is caused by accumulation of PM, the operating state of the engine 1 is set so as to reduce the amount of PM emission.

For example, the operating point is shifted to the higher-load, lower-speed side on the equi-output line. Alternatively, the operating state is changed so that the exhaust temperature is increased so as to promote PM burning (oxidization). Moreover, the operating state is changed to a higher-load, lower-speed operating state for increasing the amount of flow of exhaust so as to blow off the accumulated PM.

The control apparatus that executes the control routine as shown in FIG. 19 is adapted to determine a clogged state of the exhaust gas recirculation system, and change the operating state of the engine 1 so as to mitigate or eliminate the clogged state. Thus, clogging in the exhaust gas recirculation system or deterioration of NOx reducing function can be avoided or prevented. As a result, exhaust gas of the vehicle having the engine 1 as stated above can be kept clean and below a predetermined regulation value. Also, the clogged state of the exhaust system can be promptly cleared or eliminated, thus permitting an engine operation with favorable fuel economy.

In the illustrated embodiments as described above, the engine 1 to be controlled by the control apparatus of the invention is coupled to a continuously variable transmission (CVT) as one type of transmission. However, the invention is not limited to details of the illustrated embodiments, but the engine to be controlled may be coupled to a transmission having two or more gear positions (or change gear ratios). Furthermore, in the illustrated embodiments, the operating state of the engine 1 is changed by changing the engine speed and the engine load. However, it is also possible to change a boost pressure of the turbocharger 3, separately from or at the same time that the engine speed and engine load are changed. Moreover, emissions whose emission characteristics have a contradictory relationship with each other as used in the illustrated embodiments are not limited to NOx and PM, but may be selected from other appropriate substances.

What is claimed is:

1. A method of controlling an internal combustion engine that causes a first emission and a second emission to be generated upon combustion of a fuel, wherein an amount of the second emission in an exhaust gas increases as an operating state of the engine is changed so as to reduce an amount of the first emission in the exhaust gas, and wherein an emission control device is provided in an exhaust passage so as to purify an exhaust gas by reducing at least one of the first emission and the second emission, comprising the steps of:

determining a removal capability of the first emission and a removal capability of the second emission, respectively, in which the emission control device reduces an amount of one of the first emission and the second emission at predetermined constant intervals after rich spike or a recovery process of a filter is executed; and changing an operating state of the internal combustion engine, based on a ratio of the determined removal capabilities of the first emission to the determined removal capabilities of the second emission, so as to increase an amount of one emission of the first emission and the second emission for which the emission control device exhibits extra removal capability, relative to the amount of the other emission of the first emission and the second emission from the internal combustion engine, and so as to reduce an amount of the other emission for which the emission control device does not exhibit extra removal capability, relative to the amount of the one emission from the internal combustion engine, wherein the operating state of the internal combustion engine is set to a point on an equi-output line for the internal combustion engine, wherein the equi-output line is defined by engine speed of the internal combustion engine and torque of the internal combustion engine.

2. A method of controlling in accordance with claim 1, wherein the internal combustion engine generates particulate matters, as the first emission or the second emission, upon combustion of a fuel, wherein the emission control device controls emission of the particulate matters, comprising the steps of:

determining whether the emission control device is in a predetermined clogged state in which the emission control device is at least partially clogged by the particulate matters; and changing an operating state of the internal combustion engine so as to reduce an amount of emission of the particulate matters from the internal combustion engine.

3. The method of controlling in accordance with claim 1, wherein the point on the equi-output line is adjacent to a reduction operating line for the one emission of the first and the second emission to be reduced.

4. A control apparatus for an internal combustion engine that causes a first emission and a second emission to be generated upon combustion of a fuel, wherein an amount of the second emission in an exhaust gas increases as an operating state of the engine is changed so as to reduce an amount of the first emission in the exhaust gas, and wherein an emission control device is provided in an exhaust passage so as to purify an exhaust gas by reducing at least one of the first emission and the second emission, the control apparatus comprising:

a controller that:
determines a removal capability of the first emission and a removal capability of the second emission, respectively, in which the emission control device reduces an amount of one of the first emission and the second emission at predetermined constant intervals after rich spike or a recovery process of a filter is executed; and changes an operating state of the internal combustion engine based on a ratio of the determined removal capabilities of the first emission to the determined removal capabilities of the second emission, so as to increase an amount of one emission of the first emission and the second emission for which the emission control device exhibits extra removal capability, relative to the amount of the other emission of the first emission and the second emission from the internal combustion engine, and so as to reduce an amount of the other emission for which the emission control device does not exhibit extra removal capability, relative to the amount of the one emission from the internal combustion engine, and wherein the operating state of the internal combustion engine is set to a point on an equi-output line for the internal combustion engine, wherein the equi-output line is defined by engine speed of the internal combustion engine and torque of the internal combustion engine.

5. A control apparatus in accordance with claim 4, wherein the internal combustion engine generates particulate matters, as the first emission or the second emission, upon combustion of a fuel, wherein the emission control device controls emission of the particulate matters, wherein the controller of the control apparatus:

determines whether the emission control device is in a predetermined clogged state in which the emission control device is at least partially clogged by the particulate matters; and changes an operating state of the internal combustion engine so as to reduce an amount of emission of the particulate matters from the internal combustion engine.

6. The control apparatus in accordance with claim 4, wherein the point on the equi-output line is adjacent to a reduction operating line for the one emission of the first and the second emission to be reduced.

* * * * *